(12) United States Patent
Sakashita

(10) Patent No.: US 9,789,585 B2
(45) Date of Patent: Oct. 17, 2017

(54) WJP EXECUTION METHOD FOR REACTOR VESSEL LID AND JIGS

(75) Inventor: Hideshi Sakashita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 613 days.

(21) Appl. No.: 14/374,183

(22) PCT Filed: Jan. 30, 2012

(86) PCT No.: PCT/JP2012/052042
§ 371 (c)(1),
(2), (4) Date: Jul. 23, 2014

(87) PCT Pub. No.: WO2013/114548
PCT Pub. Date: Aug. 8, 2013

(65) Prior Publication Data
US 2015/0013414 A1    Jan. 15, 2015

(51) Int. Cl.
*C21D 7/06* (2006.01)
*B24C 1/10* (2006.01)
(Continued)

(52) U.S. Cl.
CPC .................. *B24C 1/10* (2013.01); *C21D 1/00* (2013.01); *C21D 7/06* (2013.01); *C21D 9/08* (2013.01);
(Continued)

(58) Field of Classification Search
CPC .... B24C 1/10; C21D 7/06; C21D 9/08; C21D 9/50; C21D 1/00; G21C 19/20; G21C 13/073; G21C 19/207; G21C 21/00
(Continued)

(56) References Cited

U.S. PATENT DOCUMENTS 5,037,604 A    8/1991  Bauer et al.
5,687,206 A    11/1997 Schmidt et al.
(Continued)

FOREIGN PATENT DOCUMENTS

FR    2725299 A1    4/1996
JP    64-48697 U    3/1989
(Continued)

OTHER PUBLICATIONS

Examination Report dated Jun. 22, 2016, issued in counterpart European Patent Application No. 12867409.0. (5 pages).
(Continued)

*Primary Examiner* — David B Jones
(74) *Attorney, Agent, or Firm* — Westerman, Hattori, Daniels & Adrian, LLP

(57) ABSTRACT

In a WJP execution method for a reactor vessel lid, WJP is executed on the inner surface of the reactor vessel lid in a state in which an underwater environment is formed on the inner surface of the reactor vessel lid and an aerial environment is formed on the outer surface thereof. In addition, the reactor vessel lid with a waterproof jig attached thereto is arranged in water, the waterproof jig having a cylindrical shape extending to the side of the outer surface of the reactor vessel lid and constituting a vessel with the reactor vessel lid as the bottom portion thereof. Moreover, the reactor vessel lid is arranged on a base installed in the water.

11 Claims, 22 Drawing Sheets

(51) Int. Cl.
| | |
|---|---|
| *C21D 9/08* | (2006.01) |
| *C21D 1/00* | (2006.01) |
| *C21D 9/50* | (2006.01) |
| *G21C 13/073* | (2006.01) |
| *G21C 19/20* | (2006.01) |
| *G21C 21/00* | (2006.01) |

(52) U.S. Cl.
CPC ............. *C21D 9/50* (2013.01); *G21C 13/073* (2013.01); *G21C 19/20* (2013.01); *G21C 19/207* (2013.01); *G21C 21/00* (2013.01); *Y02E 30/40* (2013.01)

(58) Field of Classification Search
USPC ............................................................ 72/56
See application file for complete search history.

(56) References Cited

U.S. PATENT DOCUMENTS

| | | | | |
|---|---|---|---|---|
| 6,341,151 | B1* | 1/2002 | Enomoto | C21D 7/06 376/249 |
| 9,193,034 | B2* | 11/2015 | Aoki | B24C 1/10 |
| 2012/0117774 | A1 | 5/2012 | Yamamoto et al. | |
| 2013/0174627 | A1* | 7/2013 | Aoki | B24C 1/10 72/56 |

FOREIGN PATENT DOCUMENTS

| | | |
|---|---|---|
| JP | 3-13891 A | 1/1991 |
| JP | 3-35195 A | 2/1991 |
| JP | 6-18692 A | 1/1994 |
| JP | 6-230167 A | 8/1994 |
| JP | 9-136261 A | 5/1997 |
| JP | 10-213694 A | 8/1998 |
| JP | 2000-218545 A | 8/2000 |
| JP | 2003-139068 A | 5/2003 |
| JP | 2008-268151 A | 11/2008 |
| JP | 2011-122845 A | 6/2011 |

OTHER PUBLICATIONS

International Search Report dated May 1, 2012 issued in corresponding application No. PCT/JP2012/052042.
Written Opinion of the Searching Authority dated May 1, 2012 issued in corresponding application No. PCT/JP2012/052042.
Written Opinion of the International Searching Authority dated May 1, 2012, issued in corresponding International Application No. PCT/JP2012/052042. (9 pages).
Decision of a Patent Grant dated Nov. 4, 2015, issued in counterpart Japanese Patent Application No. 2013-556107, with English translation. (5 pages).
Extended European Search Report dated Aug. 31, 2015 for counterpart EP application No. 12867409.0. (8 pages).
Office Action dated Mar. 24, 2015, issued in corresponding Japanese application No. 2013-556107, with partial translation. (10 pages).

* cited by examiner

FIG.16
(a)
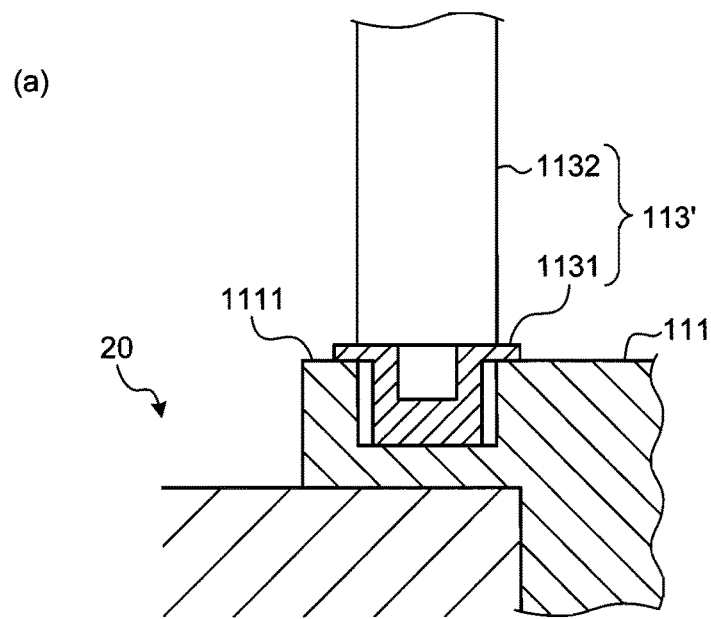
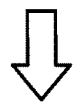
(b)
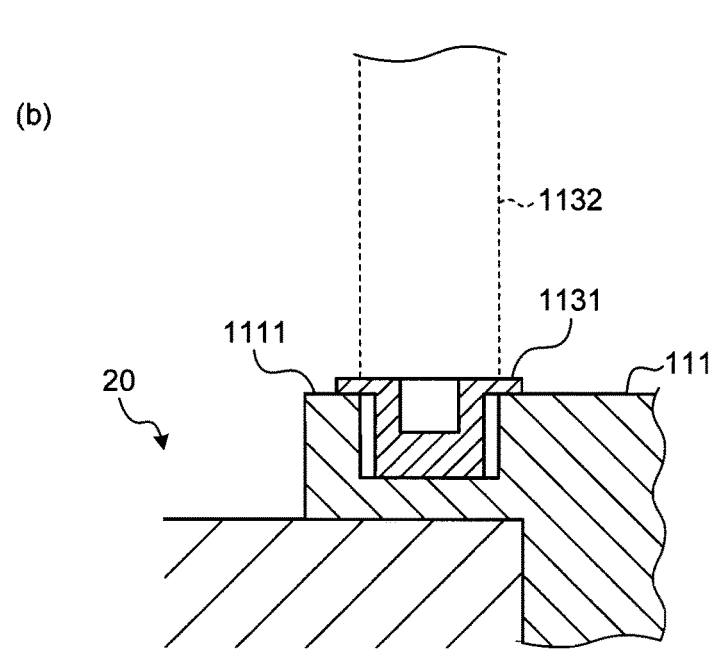

WJP EXECUTION METHOD FOR REACTOR VESSEL LID AND JIGS

FIELD

The present invention relates to a water jet peening (WJP) execution method for a reactor vessel lid and jigs, and more specifically to a WJP execution method for a reactor vessel lid and jigs that can realize the execution of WJP on the inner surface of the reactor vessel lid.

BACKGROUND

The inner surface of a reactor vessel lid is in primary cooling water at the operation of a reactor. Therefore, it is requested that WJP be executed as maintenance to reduce primary water stress corrosion cracking at the weld portions of the inner surface of the reactor vessel lid. The WJP is executed in a state in which an underwater environment is formed on the inner surface of the reactor vessel lid 112. On the other hand, since a control rod drive unit is installed over the reactor vessel lid, it is necessary to prevent the control rod drive unit from being submerged in water at the execution of the WJP.

Note that techniques described in Patent Literatures 1 and 2 have been known as conventional WJP execution methods.

CITATION LIST

Patent Literature

Patent Literature 1: Japanese Patent Application Laid-open No. 2000-218545
Patent Literature 2: Japanese Patent Application Laid-open No. 10-213694

SUMMARY

Technical Problem

The present invention has an object of providing a WJP execution method for a reactor vessel lid and jigs that realize the execution of WJP on the inner surface of the reactor vessel lid.

Solution to Problem

According to an aspect of the present invention, a WJP execution method for a reactor vessel lid includes: forming an underwater environment on the inner surface of the reactor vessel lid and an aerial environment on an outer surface of the reactor vessel lid; executing WJP on an inner surface of the reactor vessel lid.

Advantageously, a jig includes a cylindrical shape surrounding a side of an outer surface of a reactor vessel lid to constitute a vessel with the reactor vessel lid as a bottom portion thereof.

Advantageously, a jig supports a reactor vessel lid and a WJP unit in a state in which the reactor vessel lid and the WJP unit are mutually positioned.

Advantageously, a jig includes a water chamber communicating with a reactor vessel lid and capable of accommodating a WJP unit. The jig supports the reactor vessel lid and the WJP unit in a state in which the reactor vessel lid and the WJP unit are mutually positioned.

Advantageous Effects of Invention

In a WJP execution method for a reactor vessel lid according to the present invention, an underwater environment is formed on the inner surface of the reactor vessel lid, whereby WJP can be properly executed on the inner surface of the reactor vessel lid. In addition, an aerial environment is formed on the outer surface of the reactor vessel lid, whereby a unit (for example, a control rod drive unit) on the side of the outer surface of the reactor vessel lid is prevented from being submerged in water. Thus, there is an advantage in that the execution of the WJP can be realized on the inner surface of the reactor vessel lid.

BRIEF DESCRIPTION OF DRAWINGS

FIG. 16 is an explanatory view illustrating the WJP execution method for the reactor vessel lid described in FIG. 1.

DESCRIPTION OF EMBODIMENTS

Hereinafter, the present invention will be described in detail with reference to the drawings. Note that the present invention is not limited to an embodiment. In addition, the constituents of the embodiment include those replaceable and obviously replaced while maintaining the identity of the invention. Moreover, a plurality of modified examples described in the embodiment may be arbitrarily combined together as far as they are obvious for those skilled in the art.

[WJP Execution Method for Reactor Vessel Lid]

Figure 1:
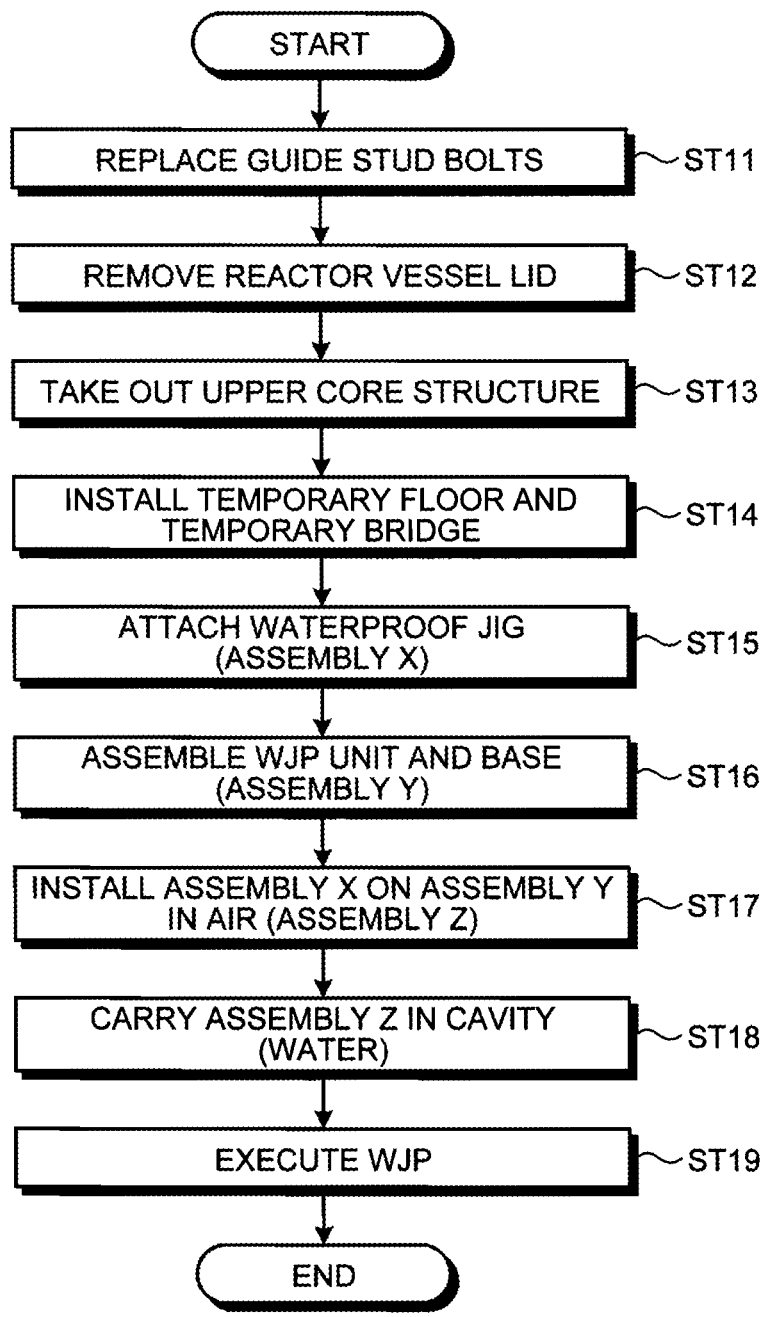
FIG. 1 is a flowchart illustrating a WJP execution method for a reactor vessel lid according to an embodiment of the present invention.

FIG. 1 is a flowchart illustrating a WJP execution method for a reactor vessel lid according to the embodiment of the present invention. FIG. 2 to FIG. 13 are explanatory views illustrating the WJP execution method for the reactor vessel lid described in FIG. 1. The figures schematically illustrate the WJP execution method for the reactor vessel lid.

The WJP execution method for the reactor vessel lid is a method for executing WJP (Water Jet Peening) on the inner surface of (particularly, the nozzle weld portions of control rod drive mechanism housings) of the reactor vessel lid and is applied to, for example, an existing pressurized water reactor.

Figure 2:
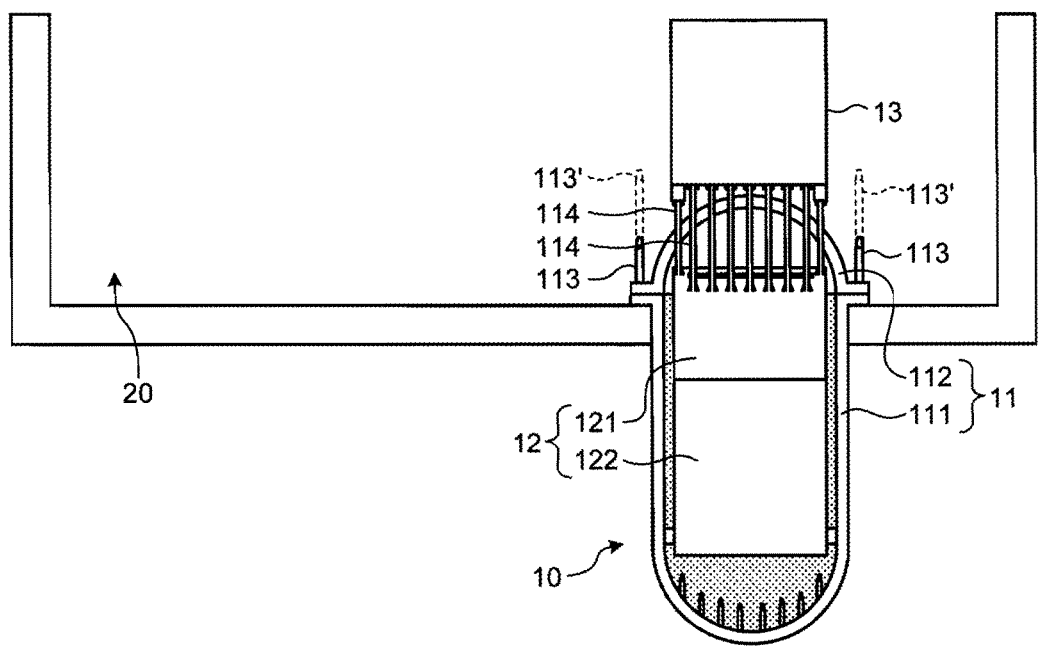
FIG. 2 is an explanatory view illustrating the WJP execution method for the reactor vessel lid described in FIG. 1.

As illustrated in FIG. 2, a reactor 10 includes a reactor vessel 11, a core structure 12, and a control rod drive unit 13. The reactor vessel 11 is constituted of a reactor vessel main body 111 and a reactor vessel lid 112. The reactor vessel main body 111 is a cylindrical vessel having a spherical-shaped bottom surface and is buried in a cavity 20 of a nuclear power plant. The reactor vessel lid 112 is a cover for covering the upper opening portion of the reactor vessel main body 111 and is fastened and fixed to the reactor vessel main body 111 through guide stud bolts 113 and stud bolts (not illustrated). The core structure 12 is constituted of an upper core structure 121 including a fuel assembly, control rods, or the like and a lower core structure 122 and is accommodated in the reactor vessel 11. The control rod drive unit 13 is a unit for driving the control rods, is arranged over the reactor vessel 11, and causes control rod drive shafts (not illustrated) to be inserted in the reactor vessel main body 111 from the reactor vessel lid 112 and joined to the core structure 12.

In addition, the reactor vessel lid 112 has control rod drive mechanism housings 114 for inserting the control rod drive shafts of the control rod drive unit 13. The control rod drive mechanism housings 114 are welded to the reactor vessel lid 112. The nozzle weld portions of the control rod drive mechanism housings 114 are made of, for example, Inconel 600 alloy.

Here, the inner surface of the reactor vessel lid 112 is arranged in primary cooling water at the operation of the reactor 10. Therefore, the WJP is executed as maintenance to reduce primary water stress corrosion cracking at the weld portions of the inner surface of the reactor vessel lid 112. As will be described later, the WJP is executed in a state in which an underwater environment is formed on the inner surface of the reactor vessel lid 112. On the other hand, since the control rod drive unit 13 is installed over the reactor vessel lid 112 as described above, it is necessary to prevent the control rod drive unit 13 from being submerged in water at the execution of the WJP.

In view of this, in the WJP execution method for the reactor vessel lid 112, the WJP is executed on the inner surface of the reactor vessel lid 112 in a state in which an underwater environment is formed on the inner surface of the reactor vessel lid 112 and an aerial environment is formed on the outer surface of the reactor vessel lid 112. Specifically, the WJP is executed on the reactor vessel lid 112 as follows (see FIG. 1 to FIG. 16).

In step ST11, the existing guide stud bolts 113 are replaced with shorter guide stud bolts 113' (see FIG. 2).

The existing guide stud bolts 113 are bolts for joining together the flange portion of the reactor vessel main body 111 and the flange portion of the reactor vessel lid 112 and are screwed with the screw holes (not illustrated) of the flange portion of the reactor vessel main body 111 to be installed. In addition, since the guide stud bolts 113 are structured to be long, they play a role in guiding the reactor vessel lid 112 when the reactor vessel lid 112 is attached and detached to and from the reactor vessel main body 111. By the replacement of such guide stud bolts 113 with the shorter guide stud bolts 113', the interference between the guide stud bolts 113' and other units or the like is reduced at the execution of the WJP. In addition, by filling the screw holes on the side of the reactor vessel main body 111 with the guide stud bolts 113', the screw holes are prevented from being submerged in water at the execution of the WJP.

In step ST12, the reactor vessel lid 112 and the control rod drive unit 13 are removed from the reactor vessel main body 111 and carried to the outside (not illustrated) of the cavity 20 in a state of being hung by a crane (not illustrated). In addition, the reactor vessel lid 112 and the control rod drive unit 13 thus carried are temporarily placed on a dedicated stand installed on the external floor of the cavity 20 and subjected to a decontamination operation (not illustrated). Note that the external floor is the permanent floor of a building and is a floor different from a temporary floor 30 that will be described later. In addition, the dedicated stand is an existing stand for use in a normal inspection.

Further, on the external floor, an inspection operation for the joining portion between the reactor vessel lid 112 and the control rod drive unit 13 is executed. Specifically, funnels, thermal sleeves, support grids, or the like are taken out from the control rod drive mechanism housings 114 as required, and only the joining portion between the reactor vessel lid 112 and the control rod drive unit 13 is left. In addition, a visual inspection for the weld portions of the control rod drive mechanism housings 114 penetrating the reactor vessel lid 112 is executed. Besides, a normal inspection operation for the reactor vessel lid 112 and the control rod drive unit 13 is executed.

Figure 14:
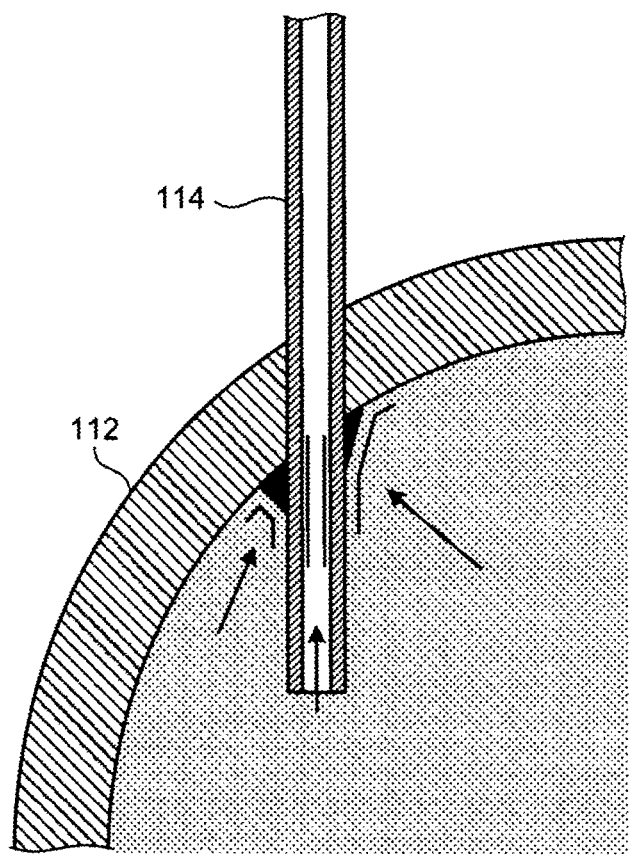
FIG. 14 is an explanatory view illustrating the WJP execution method for the reactor vessel lid described in FIG. 1.
Figure 15:
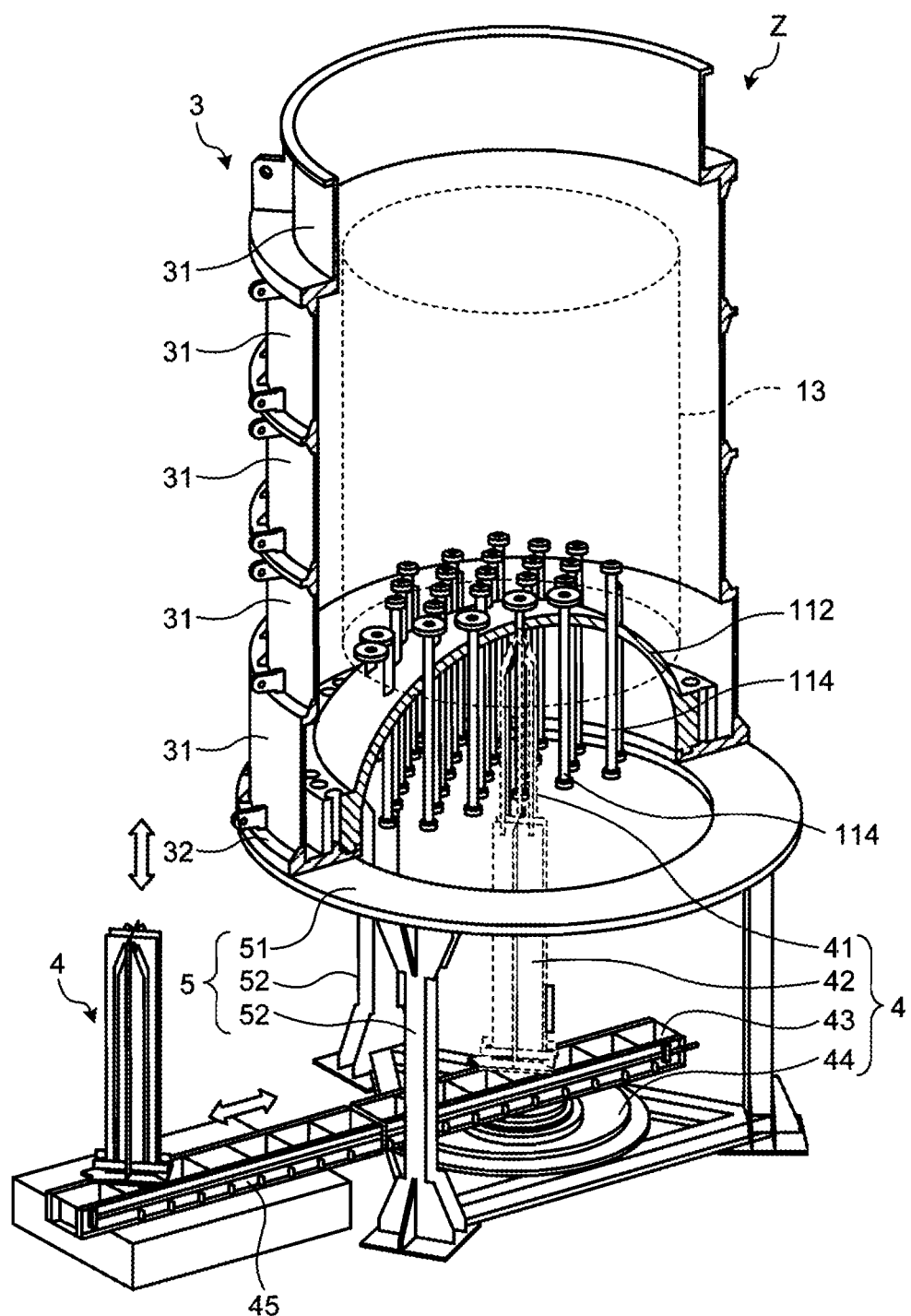
FIG. 15 is an explanatory view illustrating the WJP execution method for the reactor vessel lid described in FIG. 1.

Note that the inner surface of the reactor vessel lid 112 and the nozzles of the control rod drive mechanism housings 114 are, as illustrated in FIG. 14, fixed by J welding at the boundary portions thereof. The outside surfaces of the weld portions and the inside surfaces of the nozzles are each subjected to the WJP.

Figure 3:
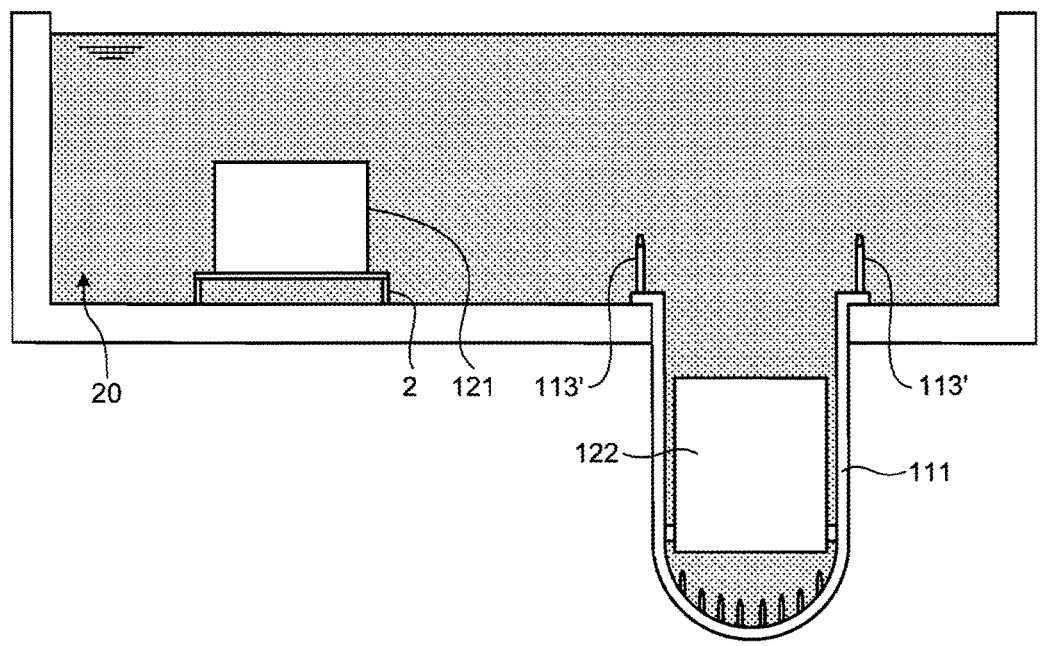
FIG. 3 is an explanatory view illustrating the WJP execution method for the reactor vessel lid described in FIG. 1.

In step ST13, water is filled in the cavity 20, and a water level inside the cavity 20 rises (see FIG. 3). On this occasion, the water supply to the cavity 20 is executed in conjunction with the hanging operation of the reactor vessel lid 112 in step ST12, and the water level inside the cavity 20 is adjusted such that the distance between a water surface inside the cavity 20 and the bottom surface of the flange portion of the reactor vessel lid 112 becomes constant. After that, the upper core structure 121 is taken out from the reactor vessel main body 111. The taken-out upper core structure 121 is placed on a stand 2 installed on the floor surface of the cavity 20. Note that the lower core structure 122 is taken out from the reactor vessel main body 111 as required and placed inside the cavity 20 (not illustrated). Then, in this state, a normal inspection operation for the reactor vessel main body 111, the upper core structure 121, the lower core structure 122, or the like is executed.

Figure 4:
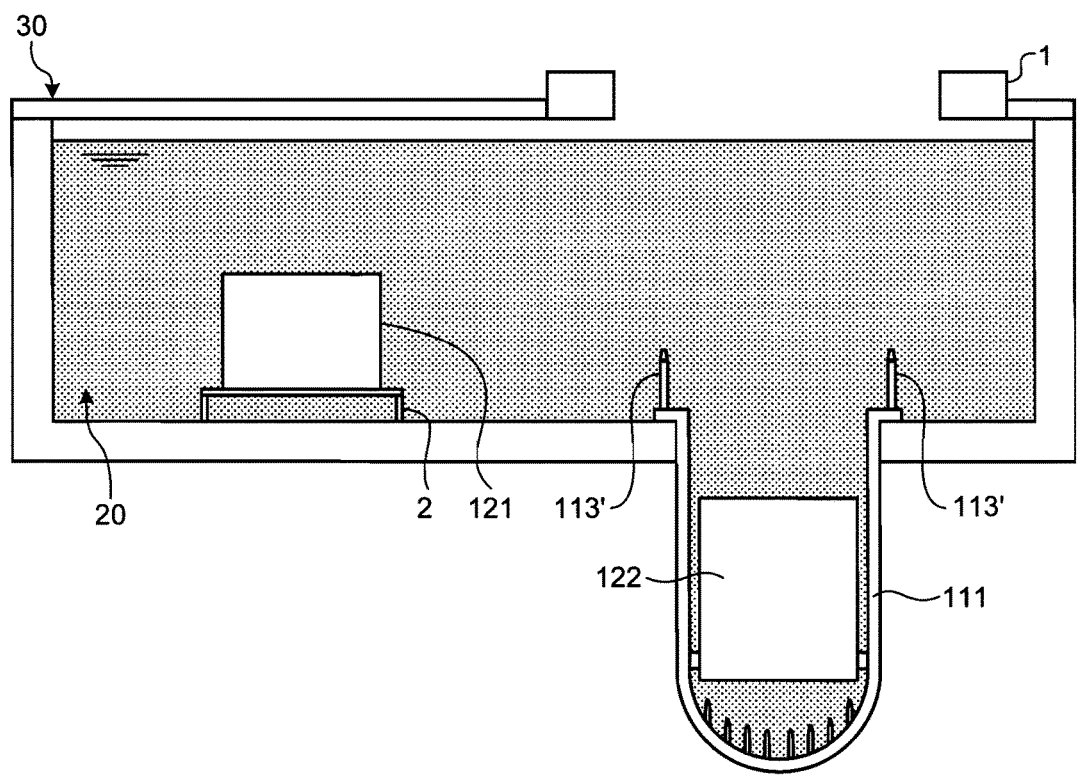
FIG. 4 is an explanatory view illustrating the WJP execution method for the reactor vessel lid described in FIG. 1.

In step ST14, the temporary floor 30 and a temporary bridge 1 are installed on the upper portion of the cavity 20 (see FIG. 4). The temporary floor 30 is a floor installed over the cavity 20 and serves as a place for temporarily placing jigs, units, or the like. In addition, as illustrated in FIG. 4, the temporary floor 30 has an opening portion for allowing jigs, units, or the like to pass through. The temporary bridge 1 is a floor installed at the opening portion of the temporary floor 30 and serves as a scaffold for an operation or a stillage.

Figure 5:
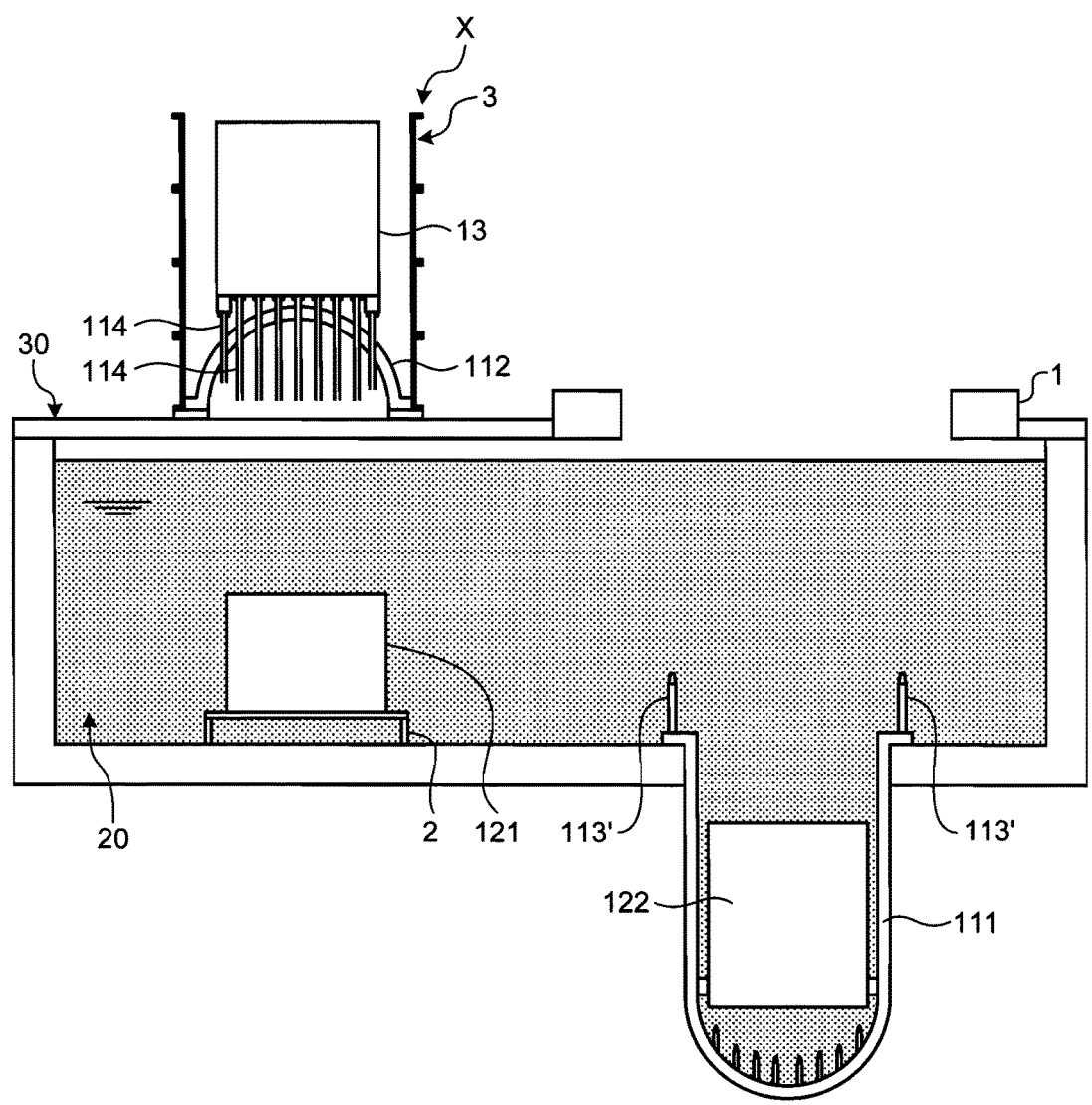
FIG. 5 is an explanatory view illustrating the WJP execution method for the reactor vessel lid described in FIG. 1.

In step ST15, a waterproof jig 3 is attached to the reactor vessel lid 112 and the control rod drive unit 13 on the temporary floor 30 (see FIG. 5). The assembly of the reactor vessel lid 112, the control rod drive unit 13, and the waterproof jig 3 is called an assembly X.

The waterproof jig 3 is a jig for preventing the control rod drive unit 13 from being submerged in water when an underwater environment is formed on the inner surface of the reactor vessel lid 112. The waterproof jig 3 has a cylindrical shape extending to the side of the outer surface of the reactor vessel lid 112 and constitutes a vessel with the reactor vessel lid 112 as the bottom portion thereof.

Figure 6:
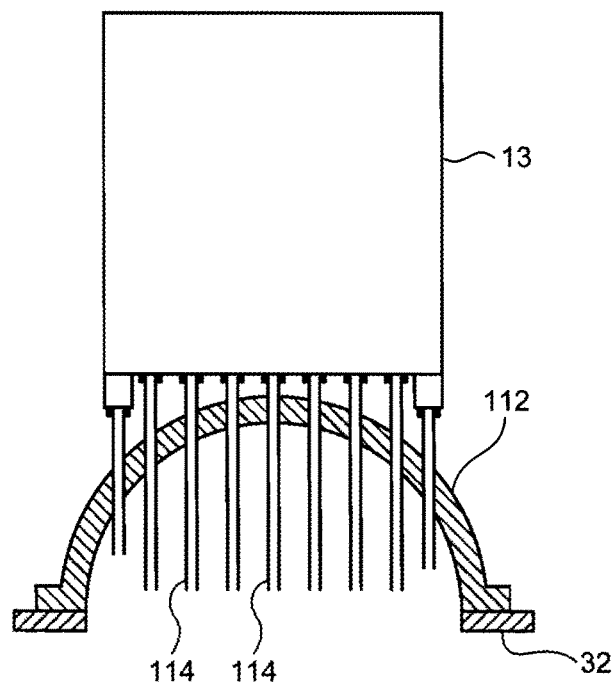
FIG. 6 is an explanatory view illustrating the WJP execution method for the reactor vessel lid described in FIG. 1.
Figure 7:
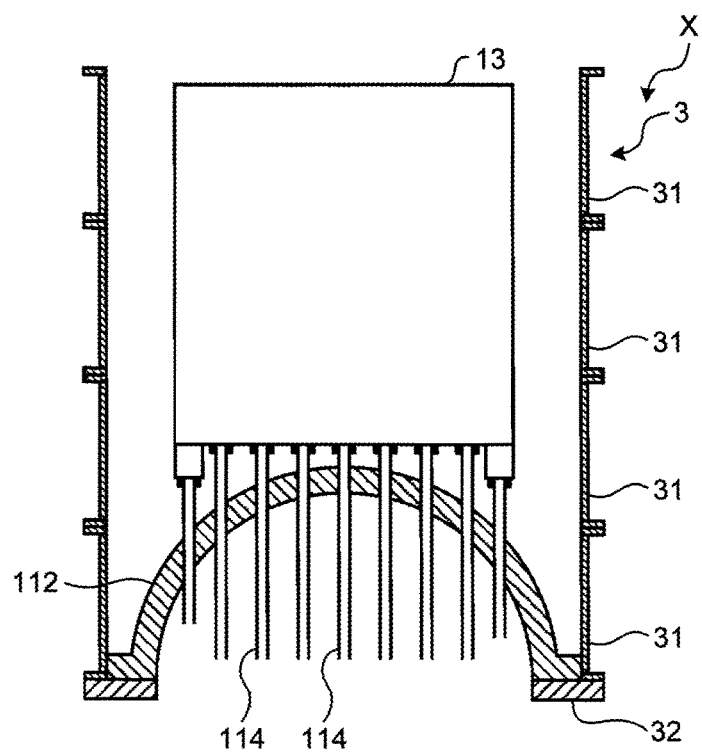
FIG. 7 is an explanatory view illustrating the WJP execution method for the reactor vessel lid described in FIG. 1.

For example, in the configuration of FIG. 5, the waterproof jig 3 has a divided structure in which cylindrical members 31 of a plurality of stages are joined together in an axial direction as illustrated in FIG. 6 and FIG. 7. In addition, the waterproof jig 3 has an inside diameter enough to surround the control rod drive unit 13 and is attached to the flange portion of the reactor vessel lid 112 at the lower end thereof to constitute a vessel with the reactor vessel lid 112 as the bottom portion thereof. Moreover, each of the cylindrical members 31 is made of a rigid material enough to withstand water pressure and has an inside diameter corresponding to the outside diameter of the reactor vessel lid 112 and the outside diameter of the control rod drive unit 13.

In the step of attaching the waterproof jig 3, a plate-shaped member 32 of a lowermost stage is installed on the temporary floor 30. Next, the reactor vessel lid 112 and the control rod drive unit 13 are placed on the plate-shaped member 32, and the plate-shaped member 32 and the reactor vessel lid 112 are joined and fixed together (see FIG. 6). On this occasion, the plate-shaped member 32 and the flange portion of the reactor vessel lid 112 are fastened by bolts, whereby the gap between the plate-shaped member 32 and the reactor vessel lid 112 is sealed. In addition, plugs (not illustrated) are attached to the vent tubes (not illustrated) of the reactor vessel lid 112 and the upper end of the control rod drive unit 13, whereby the opening portion at the upper surface of the reactor vessel lid 112 is sealed. After that, the plurality of cylindrical members 31 is successively stacked on the plate-shaped member 32 of the lowermost stage and joined together (see FIG. 7). On this occasion, the joining portion between the plate-shaped member 32 and the cylindrical member 31 and the joining portions between the adjacent cylindrical members 31 and 31 are sealed. Thus, the cylindrical vessel with the reactor vessel lid 112 as the bottom portion thereof is formed, and the control rod drive unit 13 is accommodated inside the cylindrical vessel.

Figure 8:
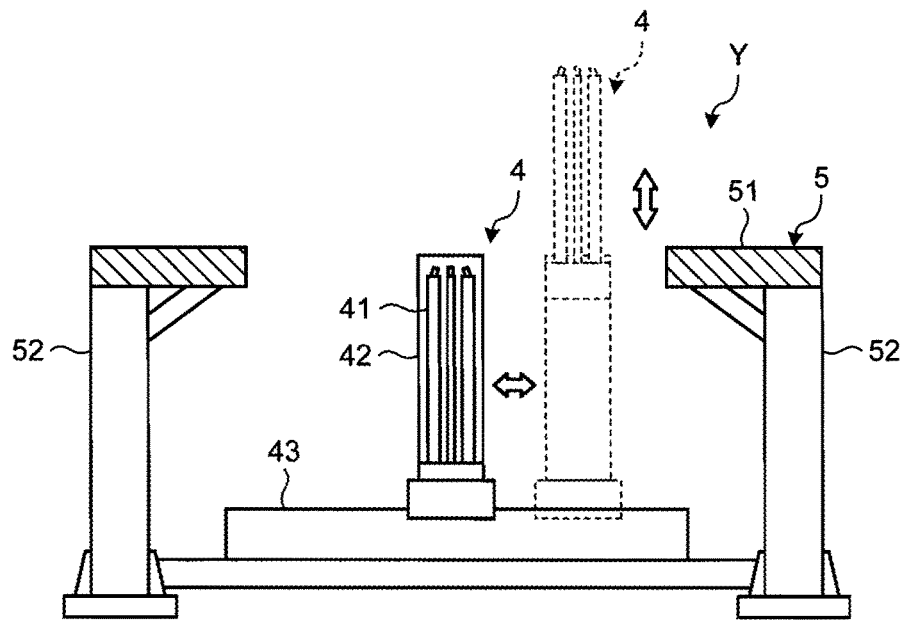
FIG. 8 is an explanatory view illustrating the WJP execution method for the reactor vessel lid described in FIG. 1.

In step ST16, a WJP unit 4 is installed on a base 5 (see FIG. 8). The assembly of the WJP unit 4 and the base 5 is called an assembly Y. The assembling operation is executed on the temporary floor 30.

Figure 13:
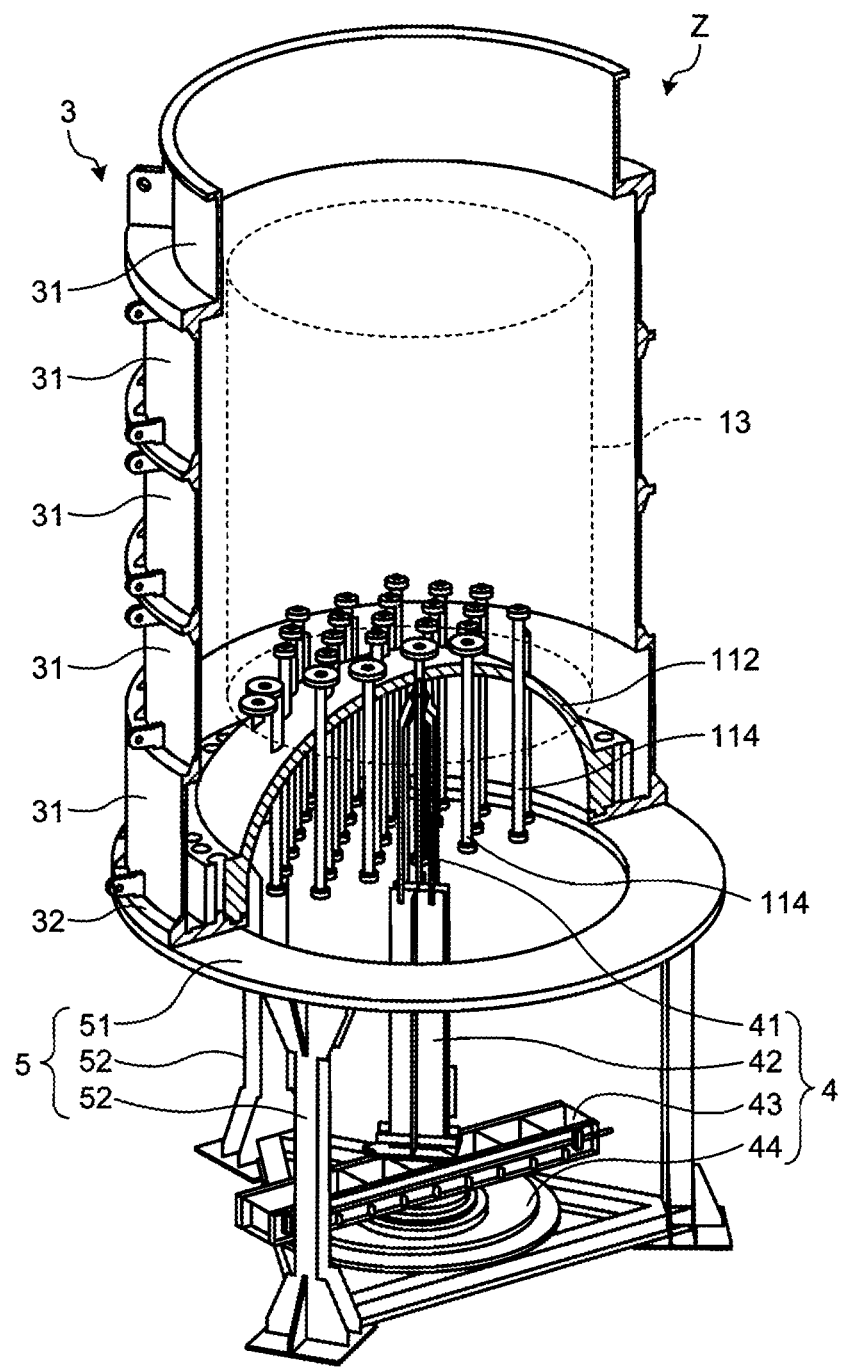
FIG. 13 is an explanatory view illustrating the WJP execution method for the reactor vessel lid described in FIG. 1.

The WJP unit 4 is a unit for executing the WJP and has, as illustrated in FIG. 13, a nozzle 41, an arm 42, a movement rail 43, and a turn table 44 (not illustrated in FIG. 8). The nozzle 41 is a nozzle for jetting water jet and is arranged with the jetting port thereof directed upward. The arm 42 rotates about the axis thereof and displaces the nozzle 41 in the axial direction and the rotational direction thereof, whereby the direction, the height, the tilt angle, or the like of the nozzle 41 can be changed. The movement rail 43 is a rail for slide-displacing the arm 42 in a horizontal direction. The turn table 44 is a table for rotation-displacing the movement rail 43 on a horizontal plane.

The base 5 is a structure for supporting the reactor vessel lid 112 and the WJP unit 4 in their positioned state and has, as illustrated in FIG. 13, a frame-shaped seat 51 and leg portions 52 for supporting the seat 51.

In the assembly Y, the WJP unit 4 is installed on the leg portions 52 of the base 5 (see FIG. 8 and FIG. 13). On this occasion, the WJP unit 4 is installed with the nozzle 41 directed upward and the turn table 44 fixed to the leg portions 52 of the seat 51. Further, after the assembling of the assembly Y, an operation test for the WJP unit 4 is executed.

Figure 9:
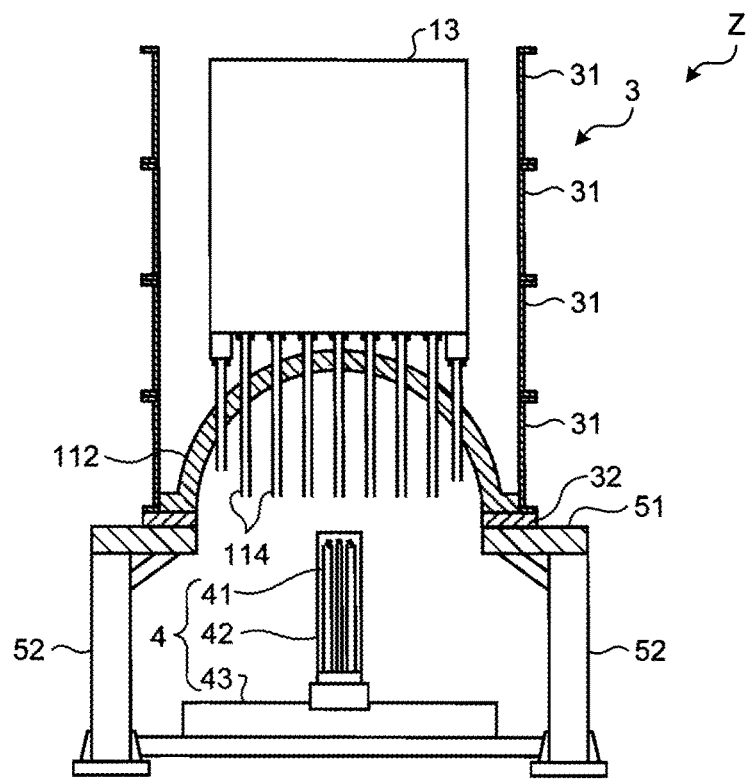
FIG. 9 is an explanatory view illustrating the WJP execution method for the reactor vessel lid described in FIG. 1.
Figure 10:
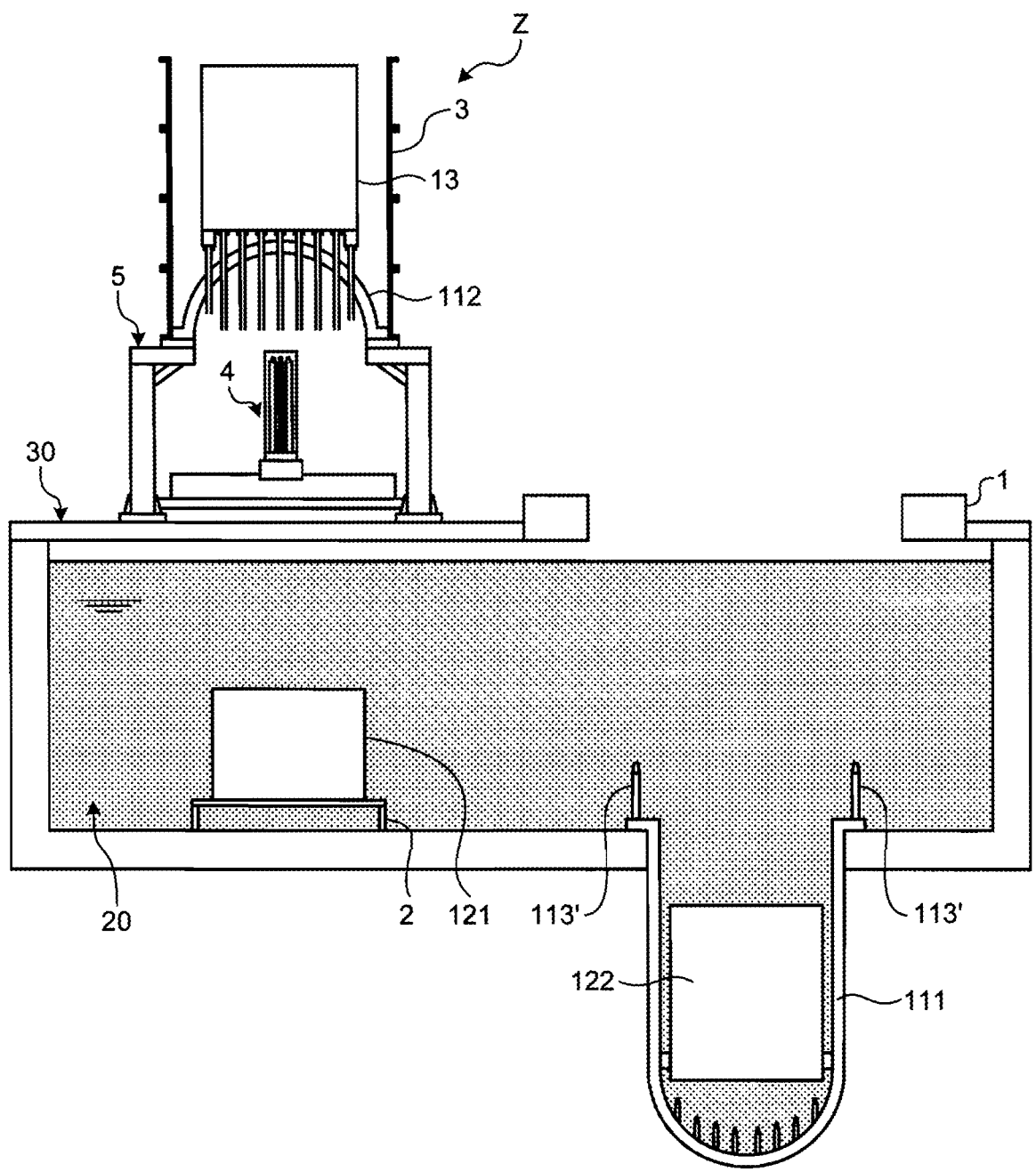
FIG. 10 is an explanatory view illustrating the WJP execution method for the reactor vessel lid described in FIG. 1.

In step ST17, the assembly X including the reactor vessel lid 112, the control rod drive unit 13, and the waterproof jig 3 is installed on the assembly Y including the WJP unit 4 and the base 5 (see FIG. 9 and FIG. 10). The assembly of the assembly X and the assembly Y is called an assembly Z. The assembling operation is executed on the temporary floor 30 (or the temporary bridge 1) in the air.

For example, in the configuration of FIG. 9, the assembly X is installed on the seat 51 of the base 5 in a state of being hung by the crane 6, and the assembly X (the plate-shaped member 32 of the waterproof jig 3) and the seat 51 are fastened by bolts and fixed together. On this occasion, the reactor vessel lid 112 is arranged with the inner surface thereof directed downward (to the side of the WJP unit 4) and the flange portion thereof fixed to the upper surface of the seat 51. Thus, the WJP unit 4 and the reactor vessel lid 112 are positioned and fixed together.

Figure 11:
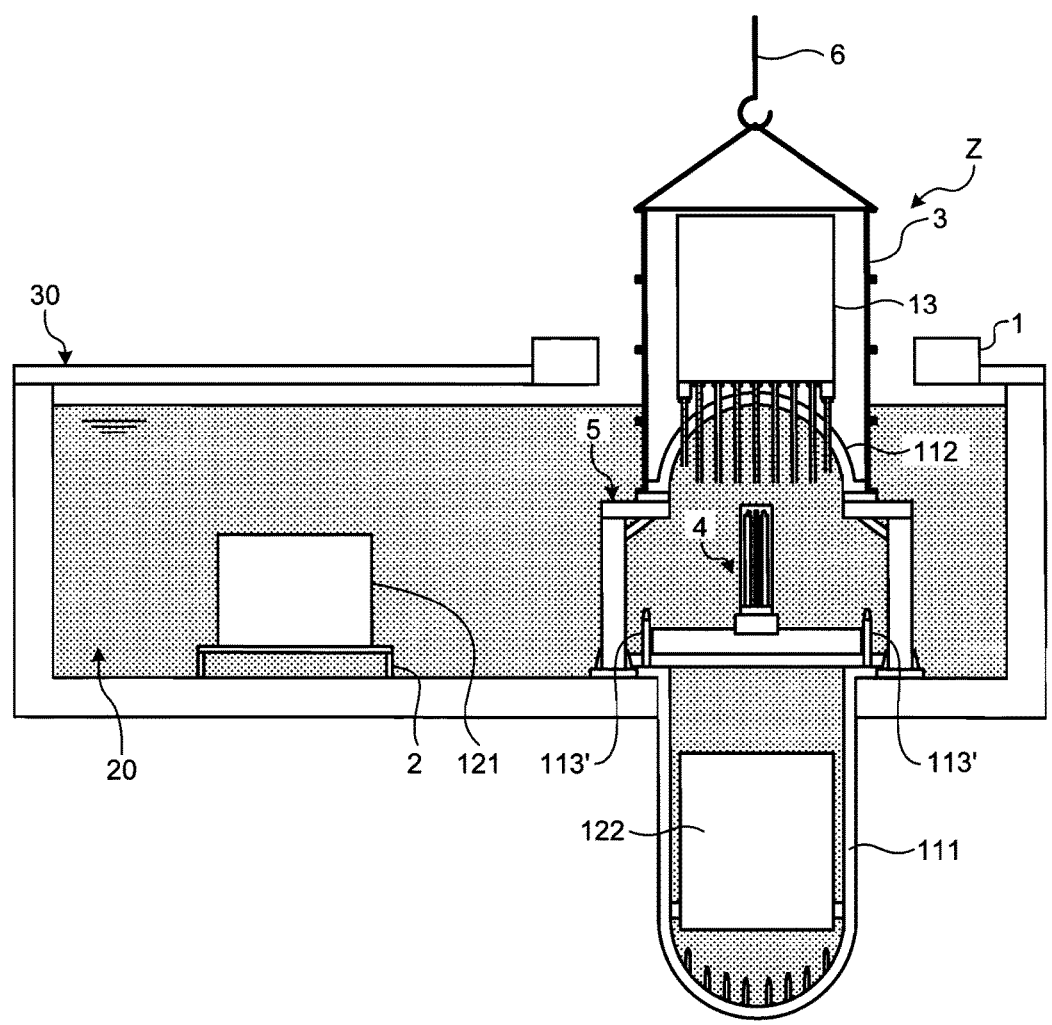
FIG. 11 is an explanatory view illustrating the WJP execution method for the reactor vessel lid described in FIG. 1.

In step ST18, the assembly Z of the reactor vessel lid 112, the control rod drive unit 13, the waterproof jig 3, the WJP unit 4, and the base 5 is carried in the cavity 20 (see FIG. 11). On this occasion, the assembly Z is carried in the cavity 20 from the temporary floor 30 in a state of being hung by the crane 6. In addition, the assembly Z is arranged at a predetermined position by the guide stud bolts 113'.

Figure 12:
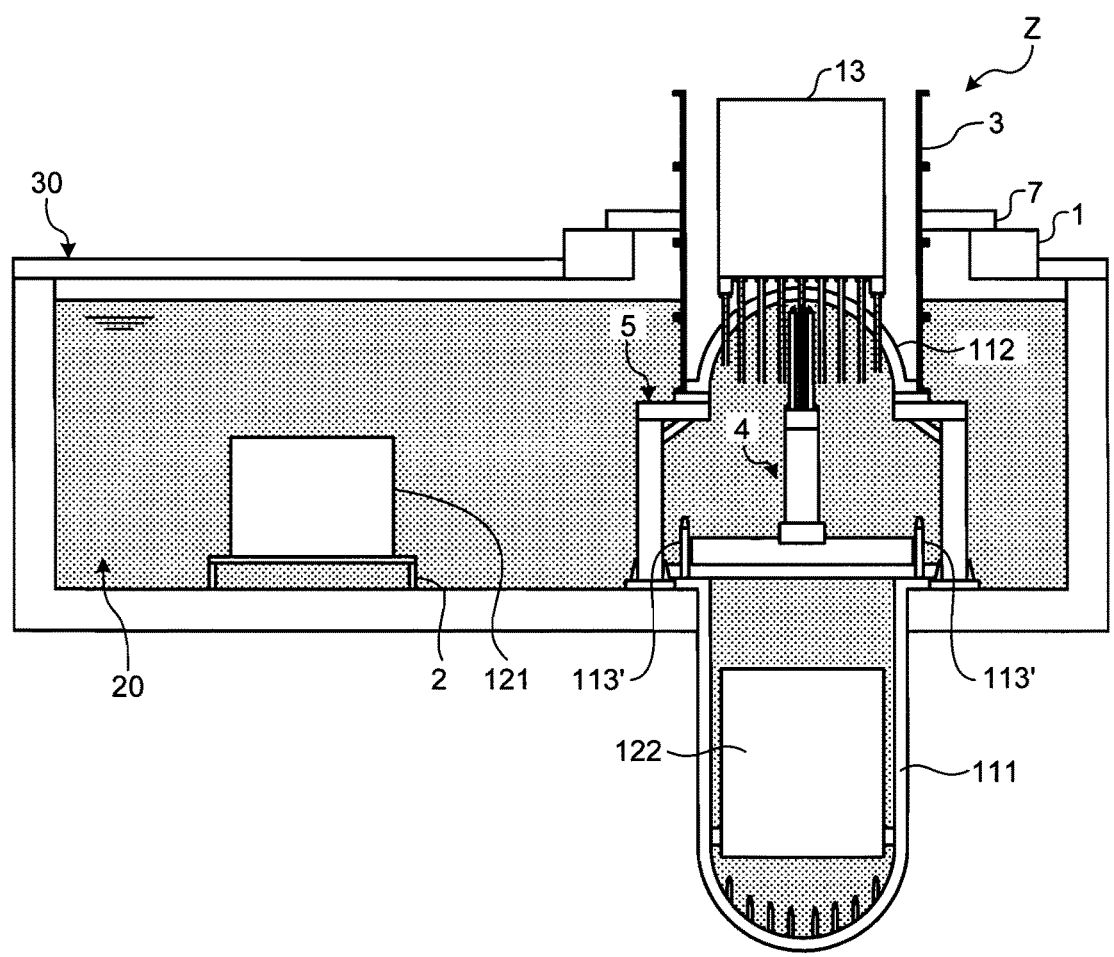
FIG. 12 is an explanatory view illustrating the WJP execution method for the reactor vessel lid described in FIG. 1.

Specifically, the base 5 is, as illustrated in FIG. 12, arranged inside the cavity 20 in a state of stretching over the flange portion of the reactor vessel main body 111. In addition, the WJP unit 4 is arranged over the reactor vessel main body 111, and the reactor vessel lid 112 is arranged over the WJP unit 4 with the inner surface side thereof directed downward. On this occasion, a water level inside the cavity 20, the height of the base 5, or the like is set such that the reactor vessel lid 112 is positioned below a water surface inside the cavity 20. Thus, an underwater environment is formed on the inner surface of the reactor vessel lid 112. On the other hand, the height (the height and the stage number of the cylindrical members 31) of the waterproof jig 3 is set such that the upper portion of the waterproof jig 3 is positioned at a level higher than the water surface inside the cavity 20. Thus, space partitioned into the waterproof jig 3 and the reactor vessel lid 112 is in the air. An aerial environment is formed on the outer surface of the reactor vessel lid 112, and the control rod drive unit 13 is prevented from being submerged in the water. Note that the air may remain inside the reactor vessel lid 112 when the assembly Z is submerged in the cavity 20. The air can be discharged through, for example, the vent tubes (not illustrated) of the reactor vessel lid 112.

In addition, after the installation of the assembly Z, a fixing jig 7 for holding the waterproof jig 3 is attached (see FIG. 12). The fixing jig 7 is fixed to the side of the temporary bridge 1 and supports the waterproof jig 3 in a circumferential direction. Thus, the assembly Z is supported in the circumferential direction thereof and stabilized.

In step ST19, the WJP is executed (see FIG. 12 to FIG. 14). The WJP is executed on each of the inner surfaces and the outer surfaces (see FIG. 14) of the nozzle weld portions of the plurality of control rod drive mechanism housings 114 on the inner surface of the reactor vessel lid 112. On this occasion, the WJP unit 4 rotates the turn table 44 and slide-displaces and rotation-displaces the arm 42 to move the nozzle 41, whereby the WJP for each of the weld portions can be successively executed.

Note that when the WJP is executed for a multiplicity of the nozzle weld portions, maintenance such as the replacement of the nozzle 41 of the WJP unit 4 is required along the way. On this occasion, (1) the assembly Z is carried onto the temporary bridge 1 in a state of being hung by the crane 6, and the maintenance of the WJP unit 4 is executed on the temporary bridge 1 (not illustrated). As an alternative configuration, (2) it may be possible to additionally install an auxiliary rail 45 on the lateral side of the base 5 and connect together the auxiliary rail 45 and the movement rail 43 of the WJP unit 4 to allow the main body (the nozzle 41 and the arm 42) of the WJP unit 4 to move to the lateral side of the base 5 through the auxiliary rail 45 (see FIG. 15). Further, it may be possible to carry only the main body (the nozzle 41 and the arm 42) of the WJP unit 4 onto the temporary bridge 1 in a state of being hung by the crane 6 to allow the maintenance of the WJP unit 4.

Then, a removal operation after the WJP is executed, for example, as follows (not illustrated). First, the assembly Z is carried onto the temporary floor 30 from the cavity 20 in a state of being hung by the crane 6. Further, in an order reverse to the steps of FIG. 6 to FIG. 9, the waterproof jig 3, the WJP unit 4, and the base 5 are removed from the reactor vessel lid 112 and the control rod drive unit 13. Furthermore, the reactor vessel lid 112 and the control rod drive unit 13 are temporarily placed on the stand installed on the external floor of the cavity 20. Next, the portions having been subjected to the WJP are inspected. Then, the components such as funnels, thermal sleeves, and support grids are restored to the control rod drive mechanism housings 114. On this occasion, the components may be replaced with other components. Next, the temporary floor 30 is removed. Then, the upper core structure 121 is returned to the reactor vessel main body 111. After that, the reactor vessel lid 112 and the control rod drive unit 13 are carried in the cavity 20 and attached to the reactor vessel main body 111 while the water level of the cavity 20 is lowered.

Note that in the above WJP execution method, the existing guide stud bolts 113 are replaced with the shorter guide stud bolts 113' (step ST11) as in FIG. 2, and then each of the steps is executed in a state in which the shorter guide stud bolts 113' are installed.

Without being limited to this, the replaced guide stud bolts 113' may have a separated structure as illustrated in FIG. 16. The guide stud bolt 113' in FIG. 16 is constituted of a plug portion 1131 and a guide portion 1132 (see FIG. 16(a)). The plug portion 1131 is a plug for filling a screw hole (a screw hole to which the existing guide stud bolts 113 is attached) on the side of a flange portion 1111 of the reactor vessel main body 111. With the plug portion 1131, the screw hole on the side of the flange portion 1111 of the reactor vessel main body 111 is filled and sealed. The guide portion 1132 constitutes the main body of the guide stud bolt 113' and is so structured as to be attachable and detachable to and from the plug portion 1131. In such a configuration, when there is a likelihood of the interference between the WJP unit 4 and the guide stud bolt 113' at, for example, the execution of the WJP (step ST19), only the guide portion 1132 of the guide stud bolt 113' can be removed from the plug portion 1131 (see FIG. 16(b)).

First Modified Example

Figure 17:
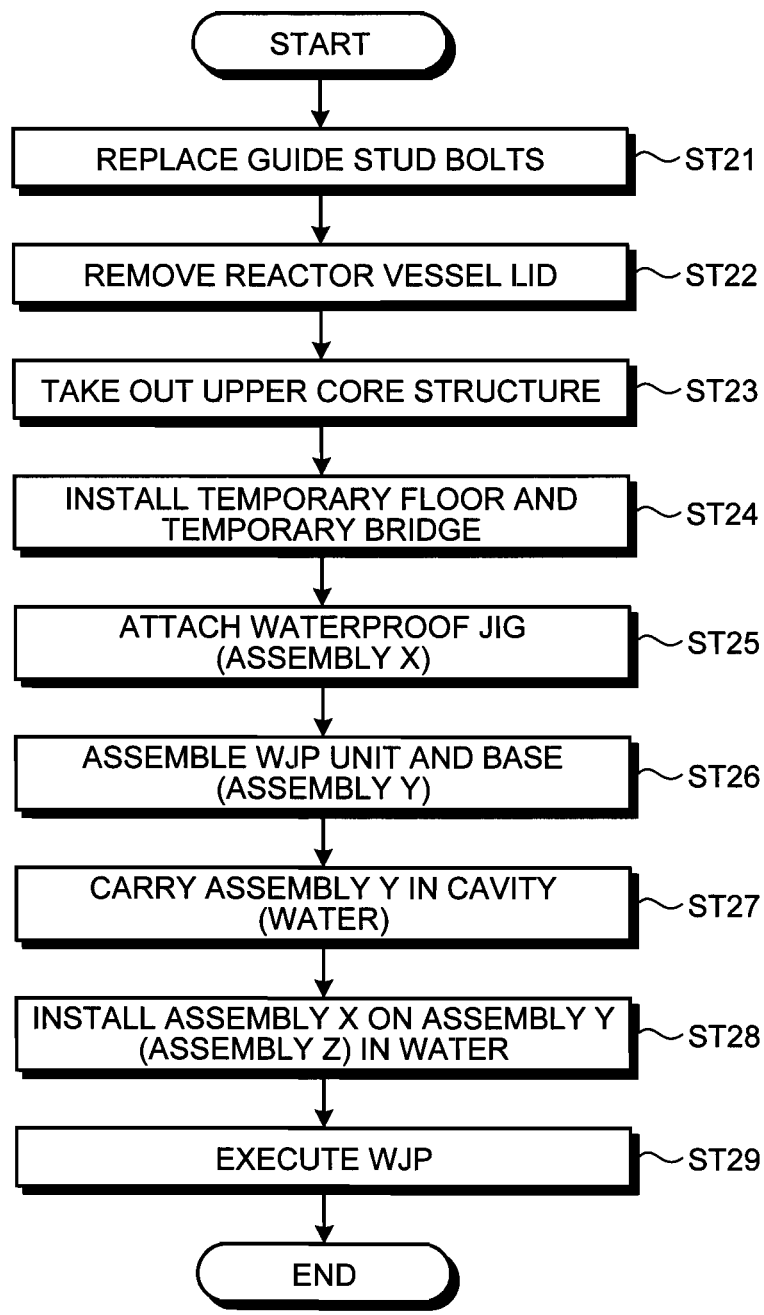
FIG. 17 is a flowchart illustrating a first modified example of the WJP execution method for the reactor vessel lid described in FIG. 1.
Figure 18:
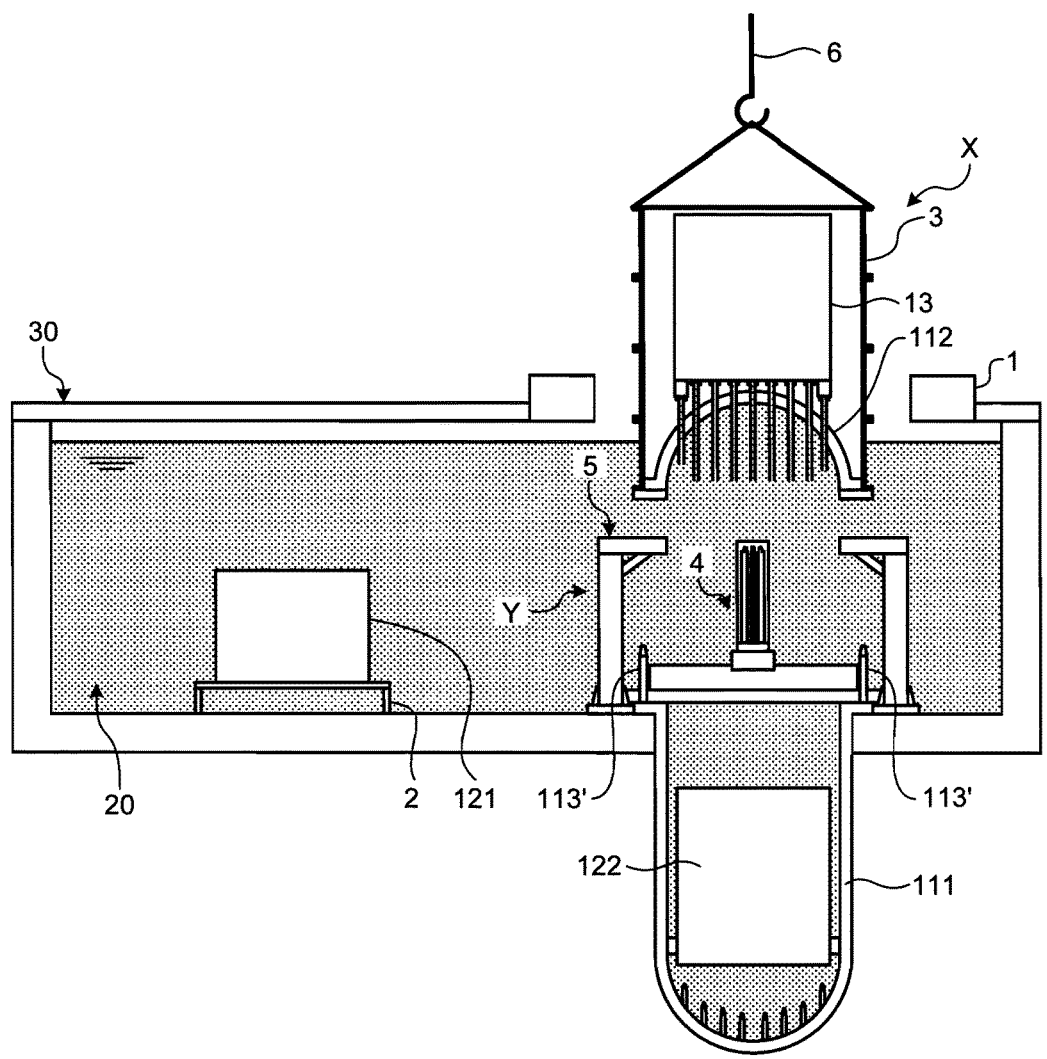
FIG. 18 is an explanatory view illustrating the WJP execution method for the reactor vessel lid described in FIG. 17.

FIG. 17 and FIG. 18 are a flowchart and an explanatory view illustrating a first modified example of the WJP execution method for the reactor vessel lid described in FIG. 1. In the first modified example, the descriptions of flows common to those of the WJP execution method for the reactor vessel lid described in FIG. 1 will be omitted.

In the configuration of FIG. 1, the assembly X of the reactor vessel lid 112, the control rod drive unit 13, and the waterproof jig 3 and the assembly Y of the WJP unit 4 and the base 5 are integrated together to constitute the assembly Z on the temporary floor 30 in the air (step ST17) (see FIG. 9 and FIG. 10), and the assembly Z is carried in the cavity 20 under water in a state of being hung by the crane 6 (step ST18) (see FIG. 11). Since the assembly Z is assembled in the air in advance and carried in the cavity 20, such a configuration is preferable in that the reactor vessel lid 112 and the WJP unit 4 can be accurately positioned.

However, without being limited to this, the assembly X and the assembly Y may be separately carried in the cavity 20 (see FIG. 17 and FIG. 18).

For example, in the first modified example of FIG. 17 and FIG. 18, the assembly X of the reactor vessel lid 112, the control rod drive unit 13, and the waterproof jig 3 and the assembly Y of the WJP unit 4 and the base 5 are each assembled in the air (steps ST25 and ST26) (see FIG. 17). Next, the assembly Y is carried in the cavity 20 under water and arranged on the reactor vessel main body 111 (step ST27). On this occasion, the assembly Y is arranged at a predetermined position by the guide stud bolts 113'. Then, the assembly X is carried in the cavity 20 and attached to the assembly Y under the water to constitute the assembly Z (step ST28) (see FIG. 18). After that, the WJP is executed (step ST29). Since the assembly X and the assembly Y are separately carried in the cavity 20, such a configuration is preferable in that the load of the crane 6 can be reduced.

Second Modified Example

Figure 19:
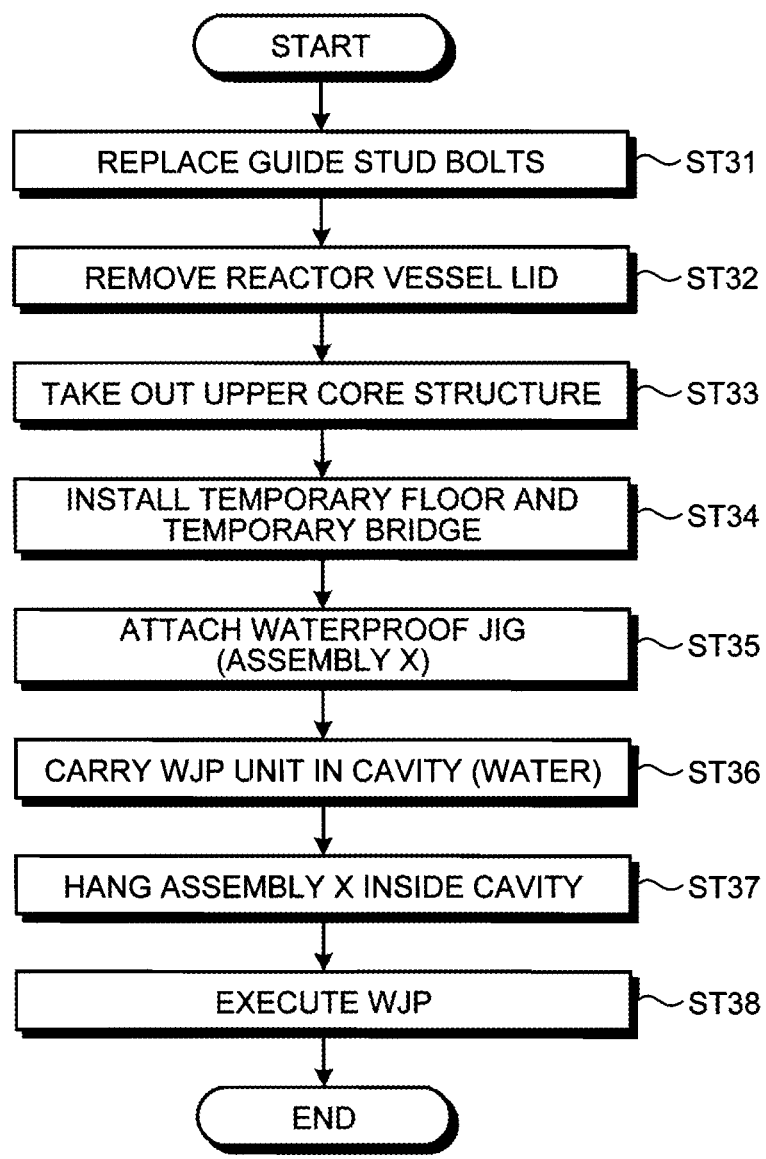
FIG. 19 is a flowchart illustrating a second modified example of the WJP execution method for the reactor vessel lid described in FIG. 1.
Figure 20:
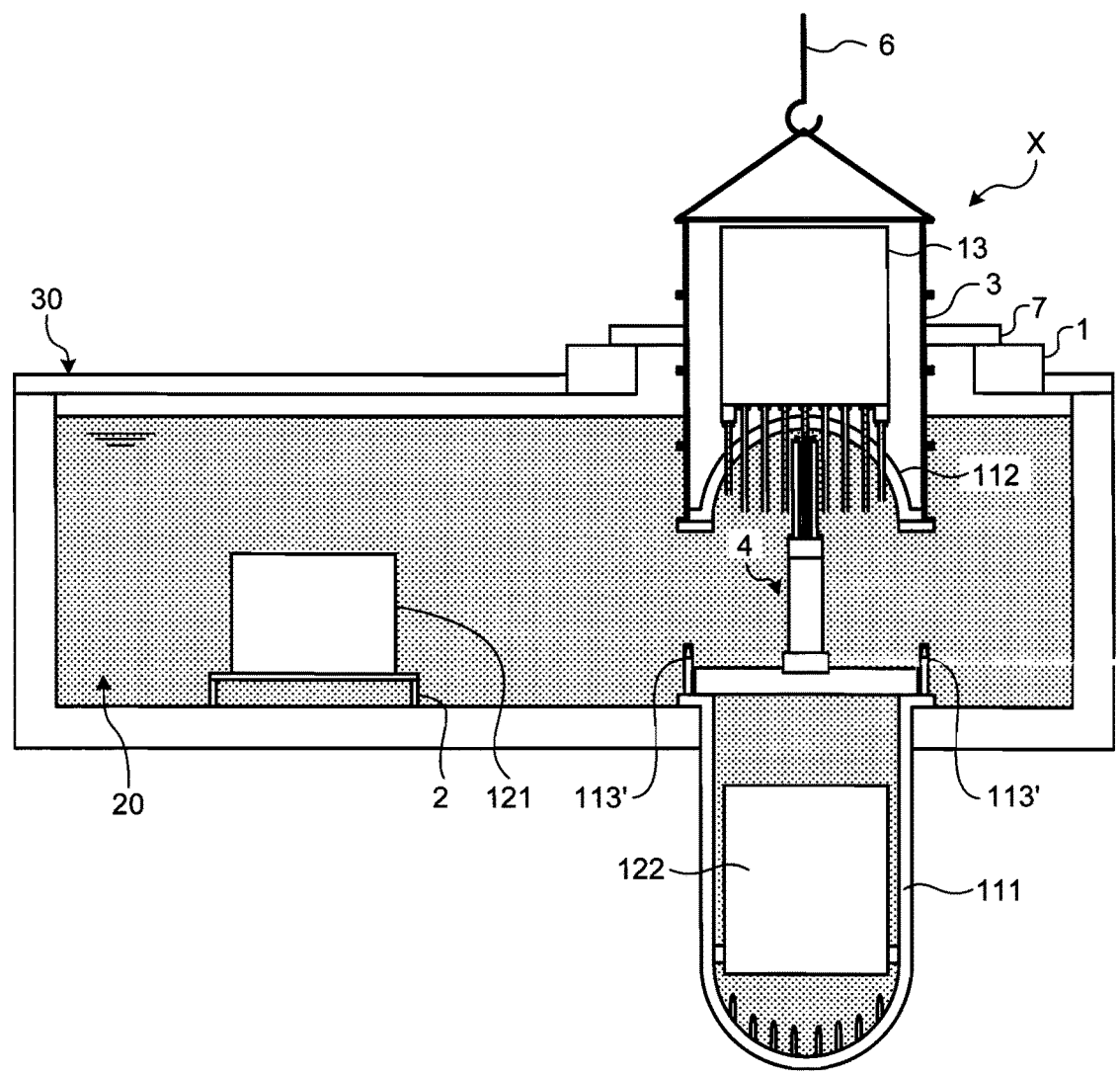
FIG. 20 is an explanatory view illustrating the WJP execution method for the reactor vessel lid described in FIG. 19.

FIG. 19 and FIG. 20 are a flowchart and an explanatory view illustrating a second modified example of the WJP execution method for the reactor vessel lid described in FIG. 1. In the second modified example, the descriptions of flows common to those of the WJP execution method for the reactor vessel lid described in FIG. 1 will be omitted.

In the configuration of FIG. 1, the WJP is executed in a state in which the assembly X is installed on the base 5 inside the cavity 20 (see FIG. 12 and FIG. 13).

However, without being limited to this, the WJP may be executed in a state in which the assembly X is hung inside the cavity 20 (see FIG. 19 and FIG. 20). In other words, the base 5 may be omitted.

For example, in the second modified example of FIG. 19 and FIG. 20, only the WJP unit 4 is first carried in the cavity 20 and arranged at a predetermined position (step ST36). On this occasion, the WJP unit 4 is arranged at the predetermined position by the guide stud bolts 113'. Next, the assembly X is held inside the cavity 20 in a state of being hung by the crane 6 (step ST37). In addition, the assembly X is held by the fixing jig 7, and the posture (height and direction) of the assembly X is fixed. Then, in this state, the WJP is executed (step ST38).

Third and Fourth Modified Examples

Figure 21:
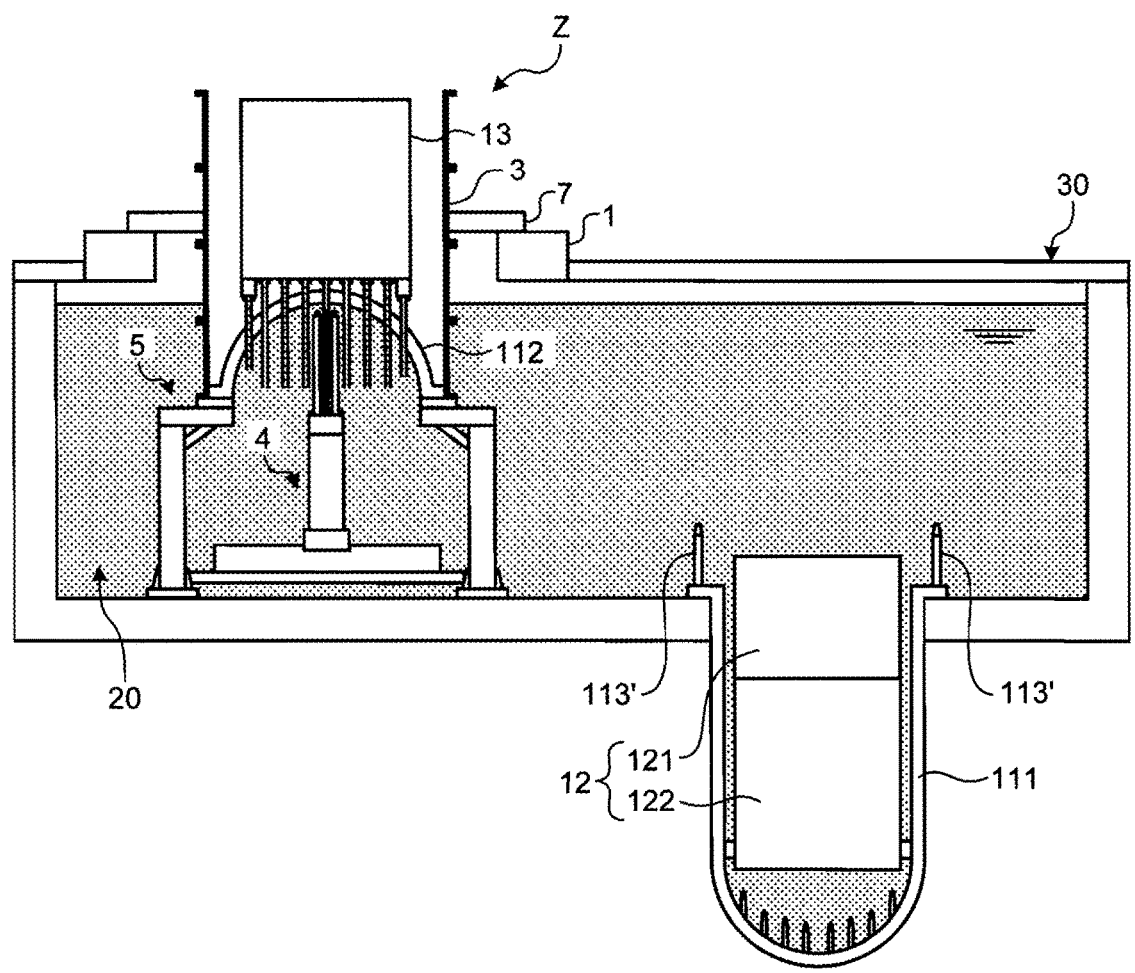
FIG. 21 is an explanatory view illustrating a third modified example of the WJP execution method for the reactor vessel lid described in FIG. 1.
Figure 22:
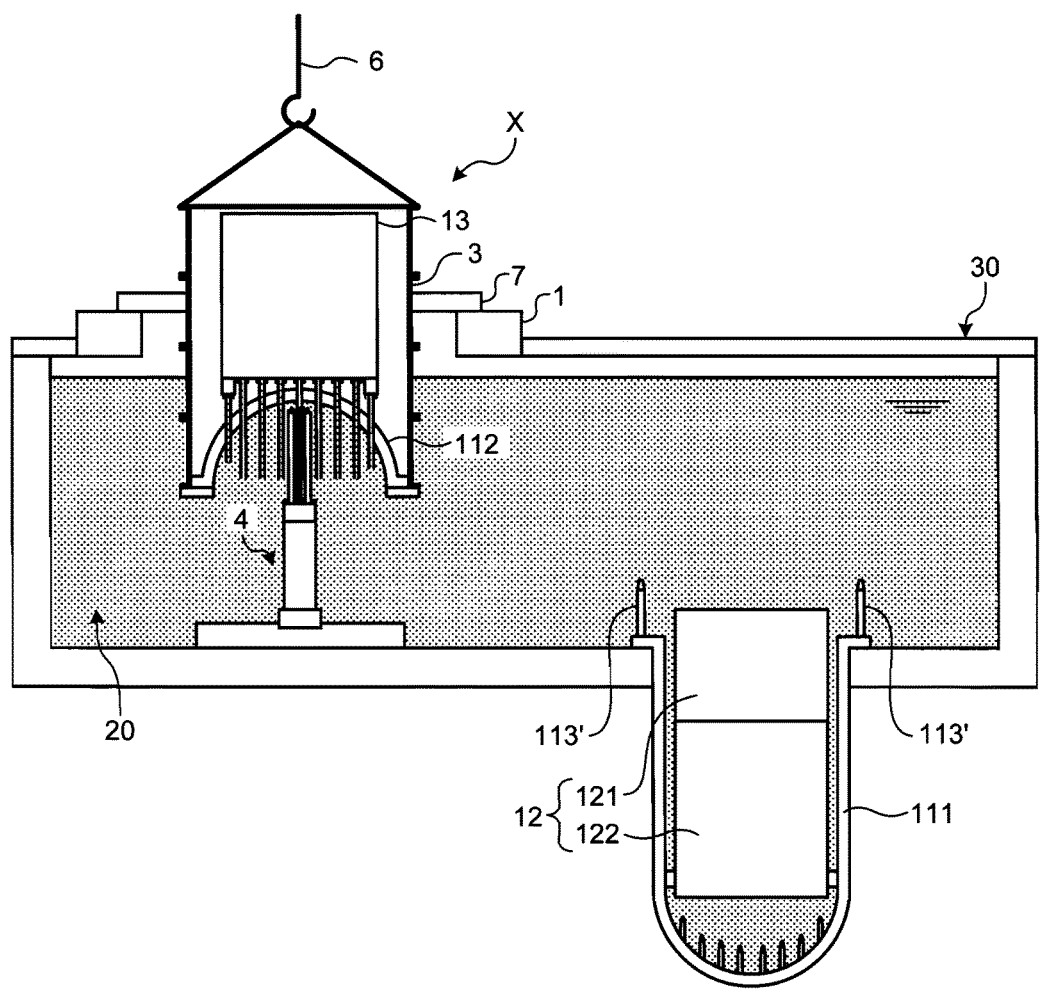
FIG. 22 is an explanatory view illustrating a fourth modified example of the WJP execution method for the reactor vessel lid described in FIG. 1.

FIG. 21 and FIG. 22 are explanatory views, respectively, illustrating third and fourth modified examples of the WJP execution method for the reactor vessel lid described in FIG. 1. In the third and fourth modified examples, the descriptions of flows common to those of the WJP execution method for the reactor vessel lid described in FIG. 1 will be omitted.

In the configuration of FIG. 1, the WJP is executed in a state in which the assembly Z is arranged over the reactor vessel main body 111 (see FIG. 12). Such a configuration is preferable in that the assembly Z can be stably elevated inside the cavity 20 under water by the guide stud bolts 113'.

However, without being limited to this, the WJP may be executed in a state in which the assembly Z is arranged inside the cavity 20 and at a position deviated from the reactor vessel main body 111 as in, for example, the third modified example of FIG. 21. Such a configuration is preferable in that the WJP can be executed regardless of the step (step ST13) of taking out the upper core structure 121 in FIG. 1.

Similarly, in the configuration of FIG. 19 and FIG. 20, the WJP is executed in a state in which the assembly X is hung inside the cavity 20 and over the reactor vessel main body 111.

However, without being limited to this, the WJP may be executed in a state in which the assembly X is hung inside the cavity 20 and at a position deviated from the reactor vessel main body 111 as in, for example, the fourth modified example of FIG. 22.

Fifth Modified Example

Figure 23:
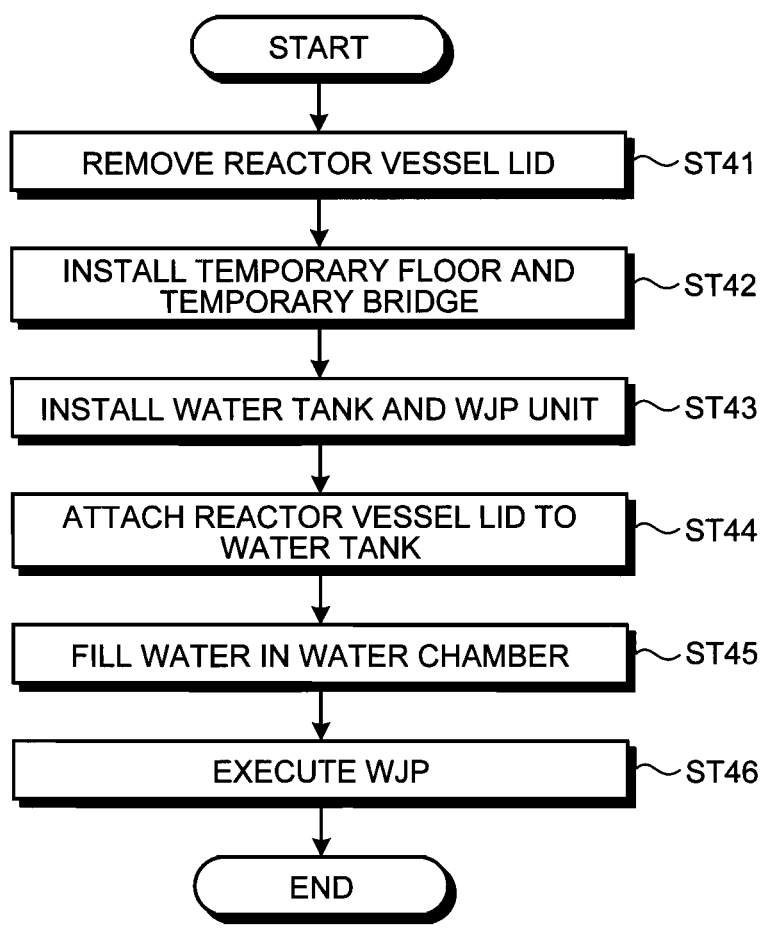
FIG. 23 is a flowchart illustrating a fifth modified example of the WJP execution method for the reactor vessel lid described in FIG. 1.
Figure 24:
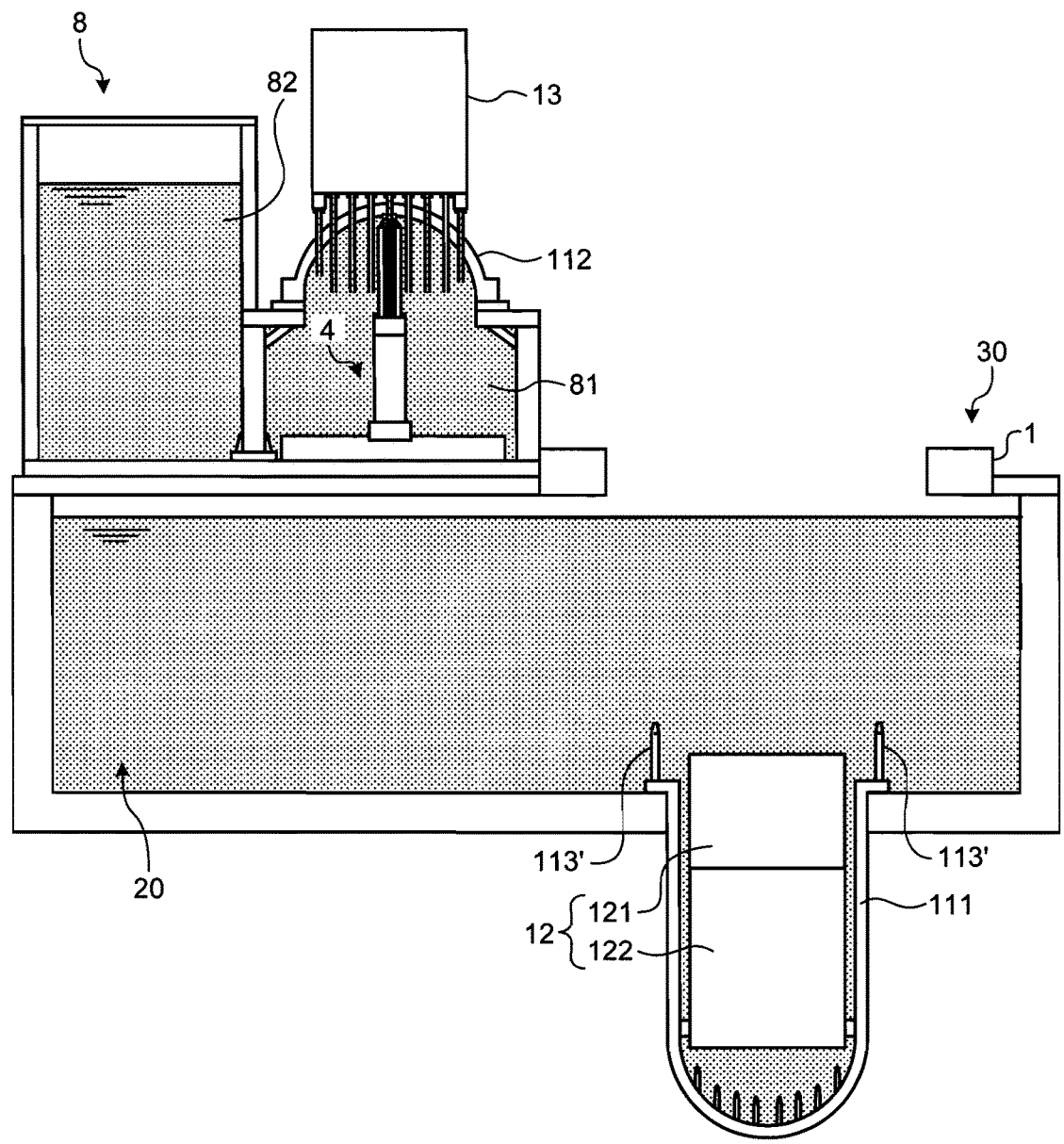
FIG. 24 is an explanatory view illustrating the WJP execution method for the reactor vessel lid described in FIG. 23.
Figure 25:
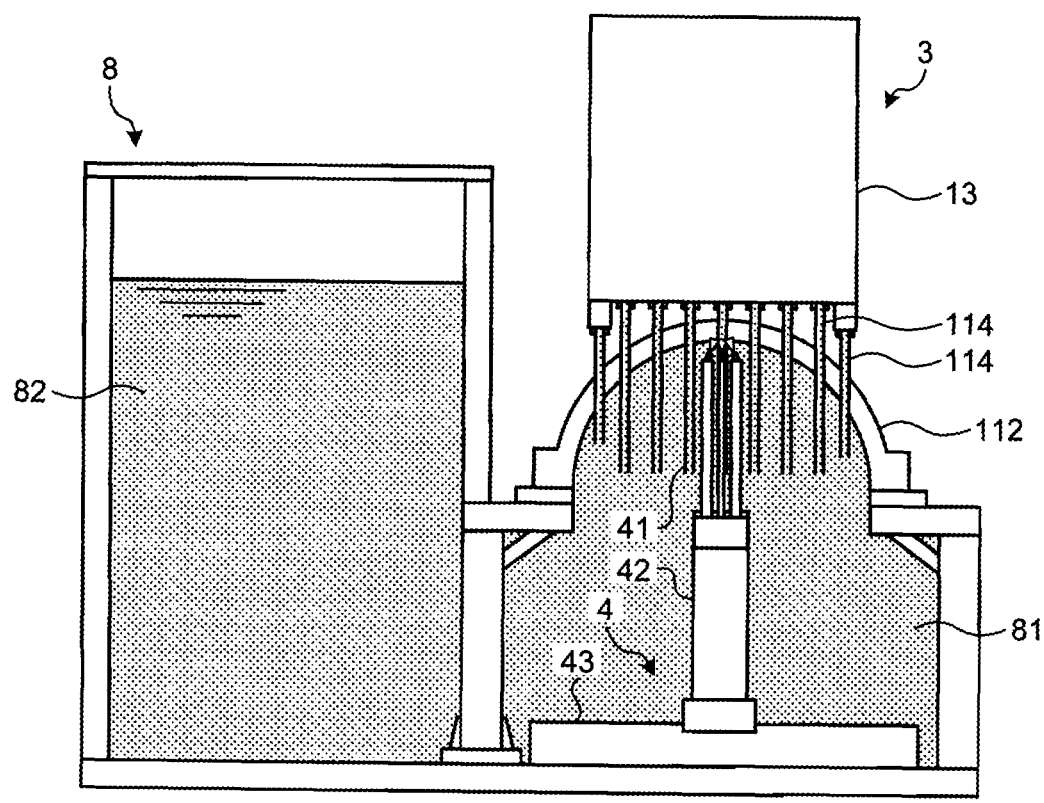
FIG. 25 is an explanatory view illustrating the WJP execution method for the reactor vessel lid described in FIG. 23.

FIG. 23 to FIG. 25 are a flowchart and explanatory views illustrating a fifth modified example of the WJP execution method for the reactor vessel lid described in FIG. 1. The figures illustrate a WJP execution method using a dedicated water tank 8. In the fifth modified example, the descriptions of flows common to those of the WJP execution method for the reactor vessel lid described in FIG. 1 will be omitted.

In the configuration of FIG. 1, the side of the inner surface of the reactor vessel lid 112 is submerged in the water of the cavity 20, whereby an underwater environment is formed on the inner surface of the reactor vessel lid 112 (see FIG. 12). In addition, the waterproof jig 3 is attached to the reactor vessel lid 112, whereby the side of the outer surface of the reactor vessel lid 112 is prevented from being submerged in the water and an aerial environment is formed on the outer surface of the reactor vessel lid 112. Such a configuration is preferable in that an underwater environment on the inner surface of the reactor vessel lid 112 and an aerial environment on the outer surface thereof can be each formed using the existing cavity 20 by the attachment of the waterproof jig 3 to the reactor vessel lid 112.

However, without being limited to this, an underwater environment on the inner surface of the reactor vessel lid 112 and an aerial environment on the outer surface thereof may be realized using other jigs under an environment other than the cavity 20. For example, it may be possible to employ a configuration in which a water chamber 81 communicating with the inner surface of the reactor vessel lid 112 is formed and the outer surface of the reactor vessel lid 112 is arranged outside the water chamber 81 (see FIG. 25). In such a configuration, water is filled in the water chamber 81 and the outside of the water chamber 81 is in the air, whereby an underwater environment on the inner surface of the reactor vessel lid 112 and an aerial environment on the outer surface thereof can be each formed.

For example, in the fifth modified example of FIG. 23 to FIG. 25, the dedicated water tank 8 is installed on the temporary floor 30 (step ST43). The water tank 8 has a first water chamber 81 and a second water chamber 82. The first water chamber 81 is a water chamber having an opening portion at the ceiling thereof, and the reactor vessel lid 112 can be attached to the opening portion. The second water chamber 82 is a water chamber for applying water pressure to the first water chamber 81 and has a wall surface positioned at a level higher than the opening portion of the ceiling of the first water chamber 81. In addition, the WJP unit 4 is installed inside the water tank 8. On this occasion, the WJP unit 4 is arranged such that the nozzle 41 of the WJP unit 4 is viewed from the opening portion of the ceiling of the first water chamber 81.

Next, the reactor vessel lid 112 is attached to the water tank 8 (step ST44). Specifically, the reactor vessel lid 112 is installed on the opening portion of the ceiling of the first water chamber 81 with the inner surface thereof directed downward. In addition, the reactor vessel lid 112 is fastened by bolts and fixed to the first water chamber 81, while the gap between the reactor vessel lid 112 and the opening portion of the first water chamber 81 is sealed.

Then, water is supplied to the water tank 8, and the first water chamber 81 is filled with the water (step ST45). On this occasion, a water level inside the second water chamber 82 is set to be at a level higher than the reactor vessel lid 112 on the first water chamber 81, whereby water pressure is applied to the first water chamber 81. On this occasion, the air inside the reactor vessel lid 112 is discharged through, for example, the vent tubes (not illustrated) of the reactor vessel lid 112. Thus, an underwater environment is formed on the inner surface of the reactor vessel lid 112. In addition, since the outer surface of the reactor vessel lid 112 is in the air outside the first water chamber 81, the control rod drive unit 13 is prevented from being submerged in the water.

After that, the WJP unit 4 is driven to execute the WJP for each of the nozzle weld portions (step ST47).

[Advantages]

As described above, in the WJP execution method for the reactor vessel lid 112, the WJP is executed on the inner surface of the reactor vessel lid 112 in a state in which an underwater environment is formed on the inner surface of the reactor vessel lid 112 and an aerial environment is formed on the outer surface thereof (see FIG. 12, FIG. 20 to FIG. 22, and FIG. 24).

In such a configuration, an underwater environment is formed on the inner surface of the reactor vessel lid 112, whereby the WJP can be properly executed on the inner surface of the reactor vessel lid 112. In addition, an aerial environment is formed on the outer surface of the reactor vessel lid 112, whereby the unit (the control rod drive unit 13) on the side of the outer surface of the reactor vessel lid 112 is prevented from being submerged in water. Thus, there is an advantage in that the execution of the WJP for the inner surface of the reactor vessel lid 112 can be realized.

In addition, in the WJP execution method for the reactor vessel lid 112, the reactor vessel lid 112 with the waterproof jig 3 attached thereto is arranged in water, the waterproof jig 3 having a cylindrical shape extending to the side of the outer surface of the reactor vessel lid 112 and constituting a container with the reactor vessel lid 112 as the bottom portion thereof (see FIG. 12 and FIG. 20 to FIG. 22). In such a configuration, the cylindrical-shaped waterproof jig 3 surrounds the side of the outer surface of the reactor vessel lid 112 when the reactor vessel lid 112 is arranged in water, whereby the unit (the control rod drive unit 13) on the side of the outer surface of the reactor vessel lid 112 is prevented from being submerged in the water. Thus, there is an advantage in that an underwater environment on the inner surface of the reactor vessel lid 112 and an aerial environment on the outer surface thereof can be each formed.

Moreover, in the WJP execution method for the reactor vessel lid 112, the reactor vessel lid 112 is arranged on the base 5 installed in water (see FIG. 13, FIG. 12, and FIG. 21). Thus, there is an advantage in that the reactor vessel lid 112 is stably supported in the water.

Further, in the WJP execution method for the reactor vessel lid 112, the base 5 is arranged over the reactor vessel main body 111 (see FIG. 12). Thus, there is an advantage in that the base 5 can be positioned by the guide stud bolts 113' of the reactor vessel main body 111 at the installation of the base 5.

Furthermore, in the WJP execution method for the reactor vessel lid 112, the base 5 may be arranged at a position deviated from the reactor vessel main body 111 (see FIG. 21).

Furthermore, in the WJP execution method for the reactor vessel lid 112, the WJP unit 4 for executing the WJP, the reactor vessel lid 112, the waterproof jig 3, and the base 5 are assembled together in the air and then arranged in water (steps ST15 to ST18) (see FIG. 1, FIG. 10 and FIG. 11). Thus, there is an advantage in that accuracy in positioning the reactor vessel lid 112 and the base 5 can be improved.

Furthermore, in the WJP execution method for the reactor vessel lid 112, the reactor vessel lid 112 is attached to the base 5 installed in water in advance (steps ST25 to ST28) (see FIG. 17 and FIG. 18). Thus, since the reactor vessel lid 112 and the base 5 can be separately carried in the cavity 20, there is an advantage in that the load of the crane 6 can be reduced.

Furthermore, in the WJP execution method for the reactor vessel lid 112, the existing guide stud bolts 113 for guiding the reactor vessel lid 112 are replaced with the shorter guide stud bolts 113' (step ST11) (see FIG. 1 and FIG. 3). Thus, there is an advantage in that the interference between the guide stud bolts 113' and other peripheral units is prevented at the execution of the WJP.

Furthermore, in the WJP execution method for the reactor vessel lid 112, the reactor vessel lid 112 is arranged in water in a state of being hung (see FIG. 20 and FIG. 22). In such a configuration, there is an advantage in that the installation of the base 5 is not required.

Furthermore, in the WJP execution method for the reactor vessel lid 112, water is filled in the cavity 20 having the reactor 10 and the reactor vessel lid 112 is submerged in the water of the cavity 20, whereby an underwater environment is formed on the inside of the reactor vessel lid 112 (see FIG. 12 and FIG. 20 to FIG. 22). In such a configuration, since an underwater environment is formed using the cavity 20, the installation of a special water tank (see, for example, FIG. 25) is not required. Thus, there is an advantage in that the WJP can be executed at low cost and a construction time can be shortened.

Furthermore, in the WJP execution method for the reactor vessel lid 112, the water chamber (the first water chamber 81) communicating with the inner surface of the reactor vessel lid 112 is formed, and the outer surface of the reactor vessel lid 112 is arranged in the air outside the water chamber 81 (see FIG. 24 and FIG. 25). Thus, there is an advantage in that an underwater environment on the inner surface of the reactor vessel lid 112 and an aerial environment on the outer surface thereof can be each formed.

Furthermore, the jig (the waterproof jig 3) has the cylindrical shape surrounding the side of the outer surface of the reactor vessel lid 112 and constitutes a vessel with the reactor vessel lid 112 as the bottom portion thereof (see FIG. 7). Since the reactor vessel lid 112 is submerged in water in a state in which the waterproof jig 3 is attached to the reactor vessel lid 112 (see, for example, FIG. 12), there is an advantage in that an underwater environment on the inner surface of the reactor vessel lid 112 and an aerial environment on the outer surface thereof can be each formed.

Furthermore, the jig (the waterproof jig 3) has the plurality of cylindrical members 31 joined together in the axial direction (see FIG. 7). In such a configuration, since the plurality of cylindrical members 31 is successively joined together, there is an advantage in that the waterproof jig 3 can be easily attached to the reactor vessel lid 112.

Furthermore, the jig (the guide stud bolt 113') has the plug portion 1131 attachable to the screw hole of the reactor vessel main body 111 and the guide portion 1132 attachable and detachable to and from the plug portion 1131 (see FIG. 16).

Furthermore, the jig (the base 5) supports the reactor vessel lid 112 and the WJP unit 4 in a state in which they are mutually positioned (see FIG. 8). Thus, there is an advantage in that the WJP can be accurately executed on the reactor vessel lid 112.

Furthermore, the jig (the water tank 8) has the water chamber (the first water chamber 81) communicating with the reactor vessel lid 112 and capable of accommodating the WJP unit 4 (see FIG. 25). In addition, the water tank 8 supports the reactor vessel lid 112 and the WJP unit 4 in a state in which they are mutually positioned. In such a configuration, since water is filled in the water chamber 81 and the outside of the water chamber 81 is in the air, there is an advantage in that an underwater environment on the inner surface of the reactor vessel lid 112 and an aerial environment on the outer surface thereof can be each formed. In addition, since the reactor vessel lid 112 and the WJP unit 4 are supported in a state of being mutually positioned, there is an advantage in that the WJP can be accurately executed on the reactor vessel lid 112.

REFERENCE SIGNS LIST 1 temporary bride
2 stand
3 waterproof jig
31 cylindrical member
32 plate-shaped member
4 WJP unit 41 nozzle
42 arm
43 movement rail
44 turn table
45 auxiliary rail
5 base
51 seat
52 leg portion
6 crane
7 fixing jig
8 water tank
81 first water chamber
82 second water chamber
10 reactor
11 reactor vessel
111 reactor vessel main body
112 reactor vessel lid
113 guide stud bolt
114 control rod drive mechanism housing
12 core structure
13 control rod drive unit
20 cavity
30 temporary floor
121 upper core structure
122 lower core structure
X to Z assembly

The invention claimed is:

1. A water jet peening (WJP) execution method for a reactor vessel lid, comprising:
    forming an underwater environment on an inner surface of the reactor vessel lid and an atmospheric environment on an outer surface of the reactor vessel lid;
    executing WJP on the inner surface of the reactor vessel lid.

2. The WJP execution method for the reactor vessel lid according to claim 1, further comprising:
    attaching a waterproof jig having a cylindrical shape extending at a side of the outer surface of the reactor vessel lid and constituting a vessel with the reactor vessel lid as a bottom portion thereof; and
    disposing the reactor vessel lid in water.

3. The WJP execution method for the reactor vessel lid according to claim 2, wherein
    the reactor vessel lid is supported by a base in the water.

4. The WJP execution method for the reactor vessel lid according to claim 3, wherein
    the base is arranged to extend over a flange portion of a reactor vessel main body, at which the reactor vessel lid is secured to the reactor vessel main body by a guide stud bolt.

5. The WJP execution method for the reactor vessel lid according to claim 3, wherein
    the base is arranged inside a cavity in which the underwater environment is formed and at a position outside a reactor vessel main body.

6. The WJP execution method for the reactor vessel lid according to claim 1, wherein
    a guide stud bolt for guiding the reactor vessel lid is replaced with a new guide stud bolt which is shorter than the guide stud bolt.

7. The WJP execution method for the reactor vessel lid according to claim 2, wherein
    the reactor vessel lid is arranged in the water in a state of being hung.

8. The WJP execution method for the reactor vessel lid according to claim 1, wherein the underwater environment on an inside of the reactor vessel lid is formed in such a way that the water is filled in the cavity having a reactor and the reactor vessel lid is submerged in the water of the cavity.

9. The WJP execution method for the reactor vessel lid according to claim 1, wherein
    a water chamber communicating with the inner surface of the reactor vessel lid is formed, and the outer surface of the reactor vessel lid is arranged in the air outside the water chamber.

10. A jig comprising:
    a reactor vessel lid disposed at a bottom; and
    a barrel that is attached on a periphery of the reactor vessel lid and has a cylindrical shape to surround a side of an outer surface of the reactor vessel lid.

11. The jig according to claim 10,
    wherein the barrel is made of a plurality of pieces having cylindrical shapes arranged in an axial direction.

* * * * *